United States Patent
Yamamoto

(10) Patent No.: US 8,144,246 B2
(45) Date of Patent: Mar. 27, 2012

(54) VIDEO SIGNAL PROCESSING APPARATUS, METHOD, AND COMPUTER PROGRAM PRODUCT FOR CONVERTING INTERLACED VIDEO SIGNALS INTO PROGRESSIVE VIDEO SIGNALS

(75) Inventor: Katsuya Yamamoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 610 days.

(21) Appl. No.: 12/361,044

(22) Filed: Jan. 28, 2009

(65) Prior Publication Data
US 2009/0225222 A1    Sep. 10, 2009

(30) Foreign Application Priority Data
Mar. 10, 2008 (JP) .................. 2008-060332

(51) Int. Cl.
*H04N 5/50* (2006.01)
(52) U.S. Cl. ....................................... 348/448
(58) Field of Classification Search .................. 348/448, 348/441, 458, 459, 911, 445, 443
See application file for complete search history.

(56) References Cited

U.S. PATENT DOCUMENTS

| | | | |
|---|---|---|---|
| 7,233,362 B2* | 6/2007 | Wu ................... | 348/448 |
| 7,349,028 B2* | 3/2008 | Neuman et al. ............. | 348/448 |
| 7,499,103 B2* | 3/2009 | Thompson et al. ........... | 348/448 |
| 7,557,861 B2* | 7/2009 | Wyman .......................... | 348/441 |
| 2004/0070686 A1* | 4/2004 | Jung et al. ..................... | 348/448 |
| 2008/0062310 A1* | 3/2008 | Sato .............................. | 348/452 |

FOREIGN PATENT DOCUMENTS

| | | |
|---|---|---|
| JP | 2002-57994 | 2/2002 |
| JP | 2006-140572 | 6/2006 |

\* cited by examiner

*Primary Examiner* — Paulos Natnael
(74) *Attorney, Agent, or Firm* — Oblon, Spivak, McClelland, Maier & Neustadt, L.L.P.

(57) ABSTRACT

There is provided a video signal processing apparatus that includes: a video signal input unit that receives an input of interlaced video signals for displaying several screens including at least two screens adjacent to each other in the vertical direction; and a converting unit that converts the input interlaced video signals into progressive video signals, the lowermost line of a valid image region in which an image is displayed through the interlaced video signals being converted with the use of the interlaced video signal corresponding to the uppermost line of the valid image region of a screen located below the subject screen if any, the uppermost line of the valid image region of the subject screen being converted with the use of the interlaced video signal corresponding to the lowermost line of the valid image region of a screen located above the subject screen if any.

9 Claims, 18 Drawing Sheets

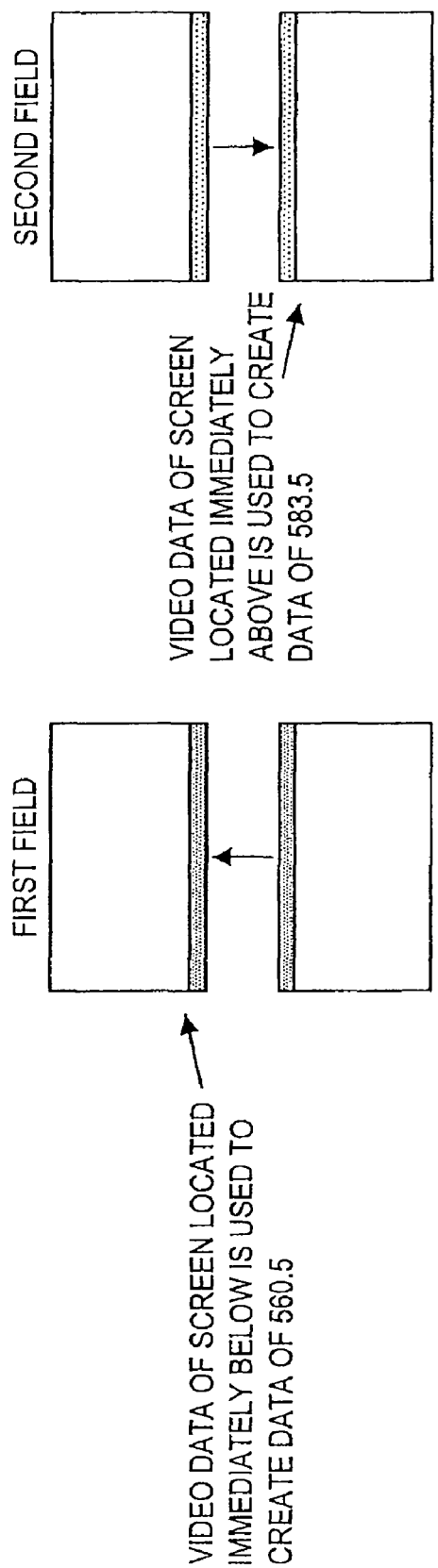

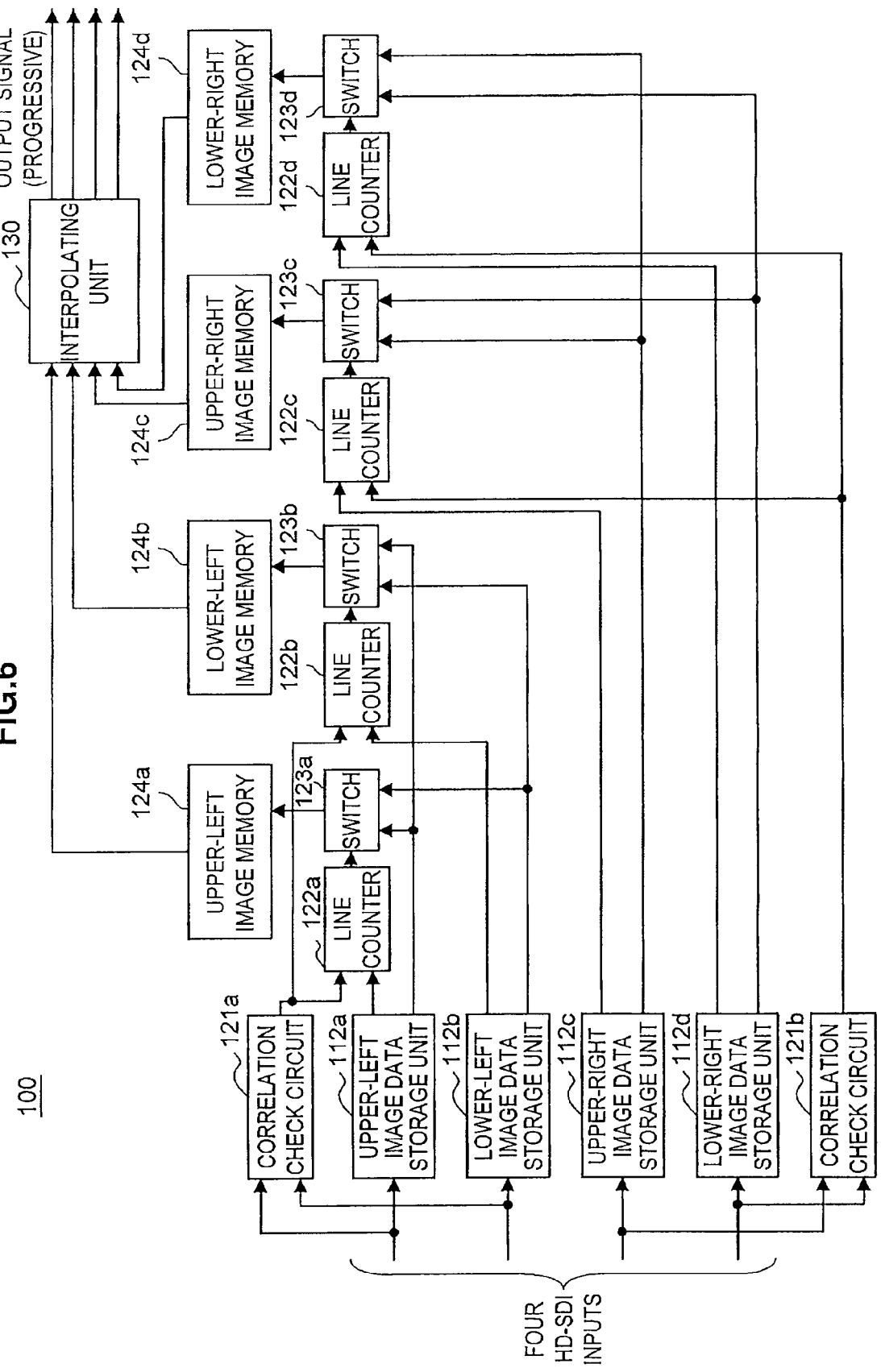

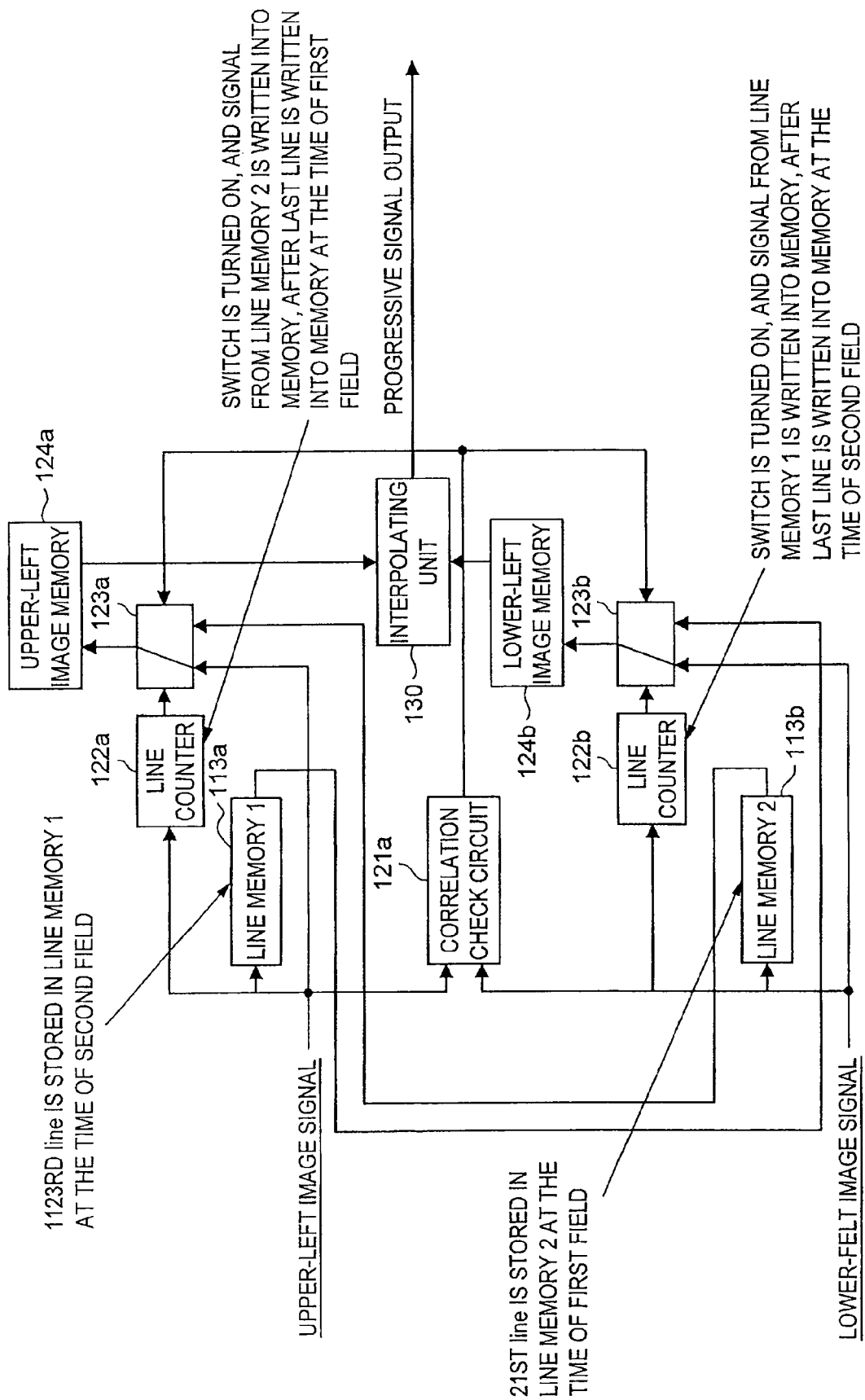

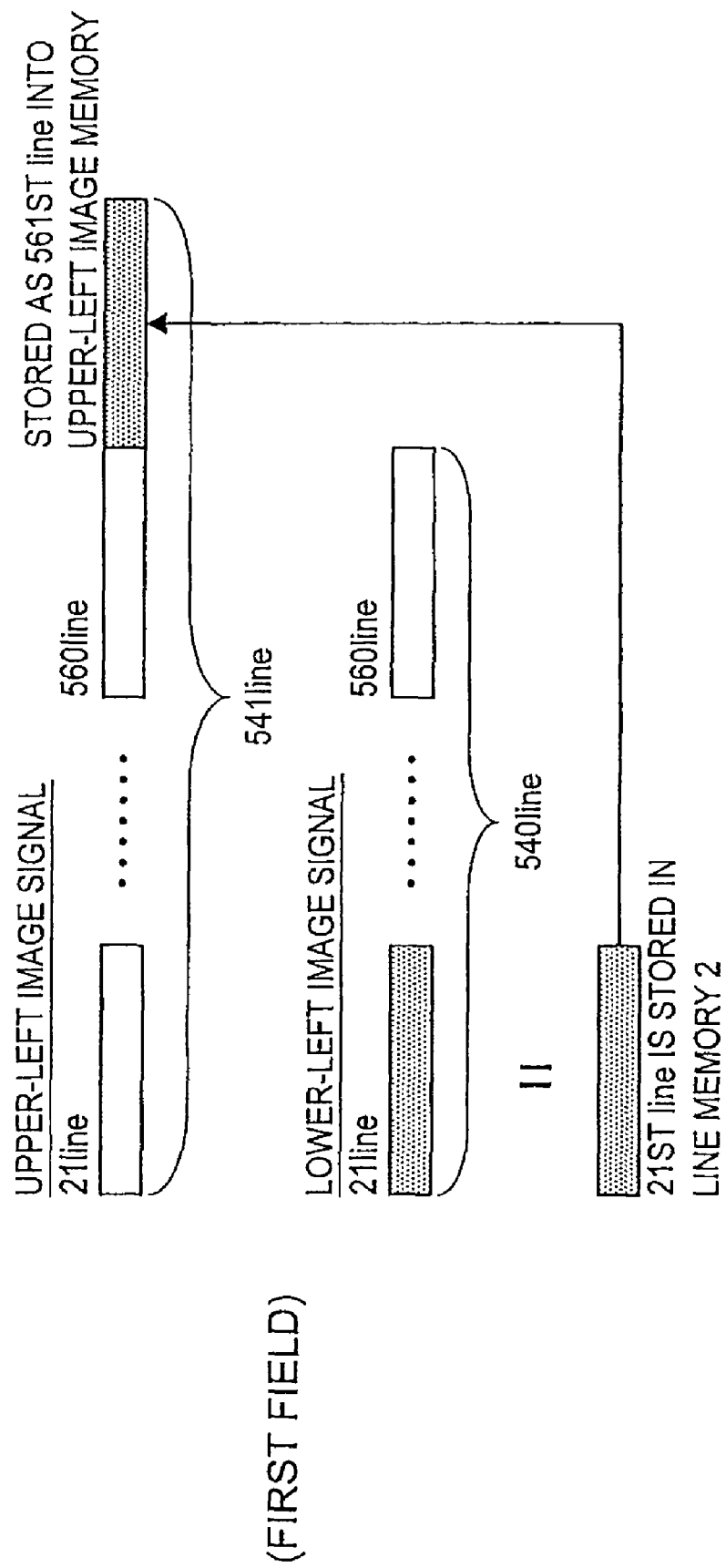

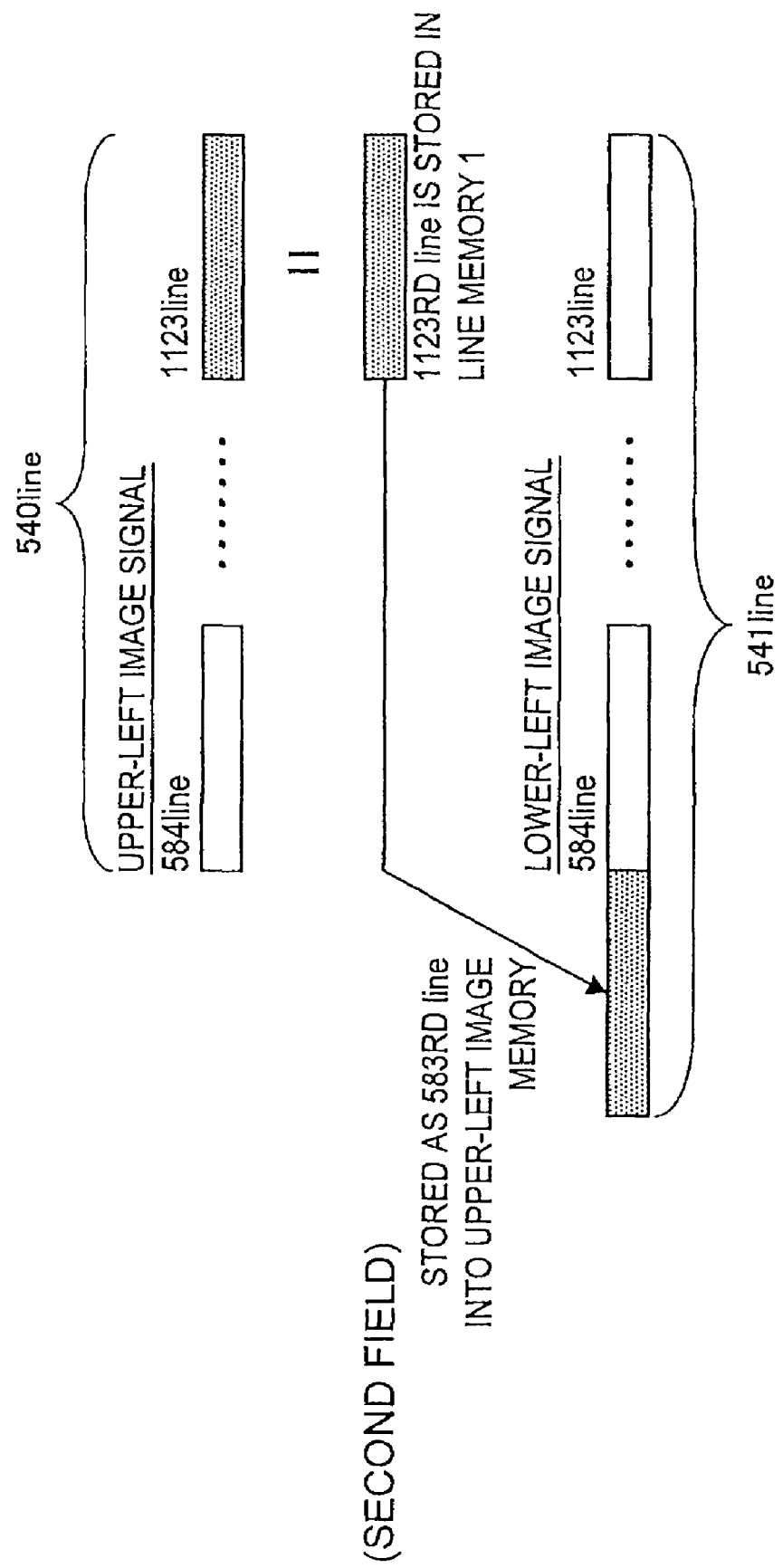

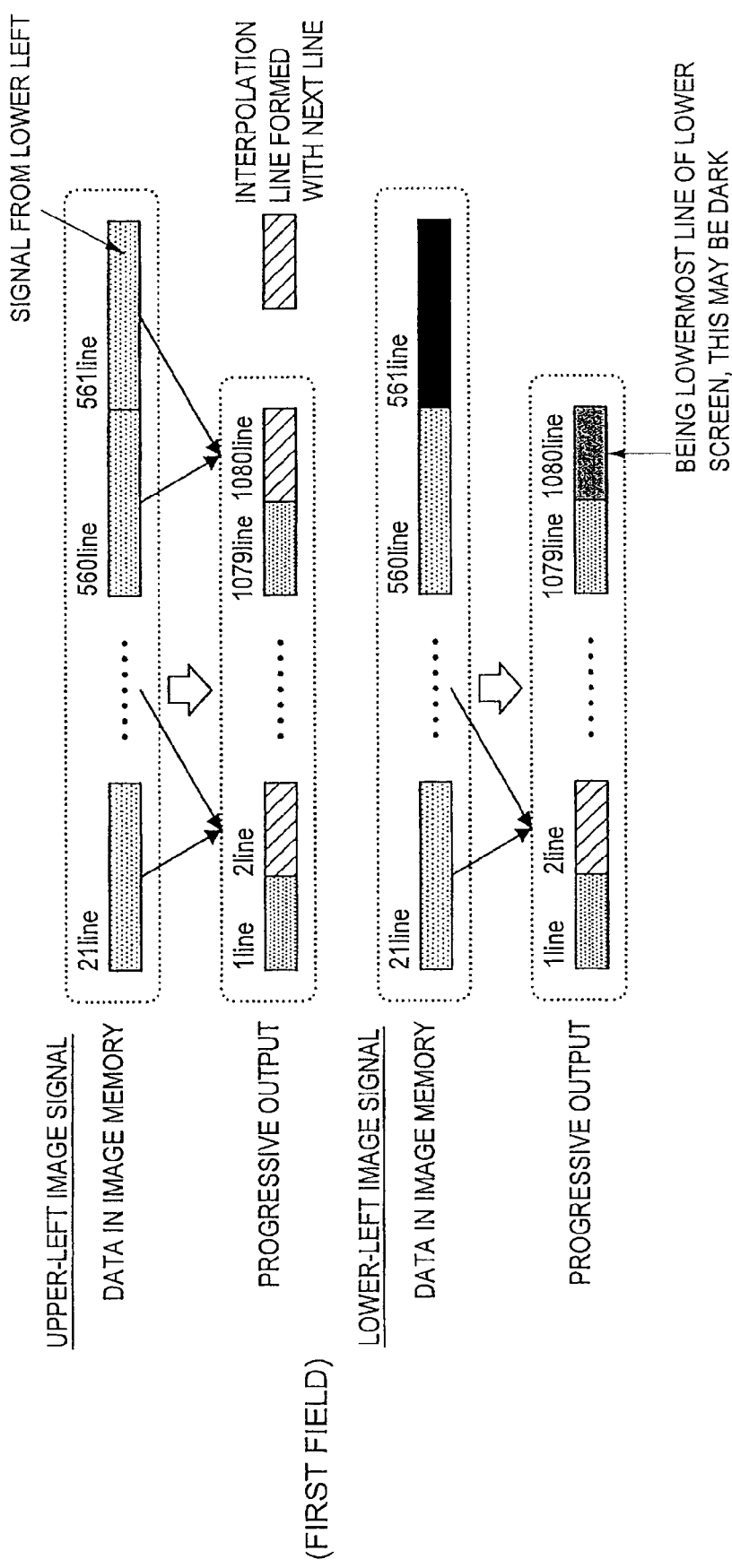

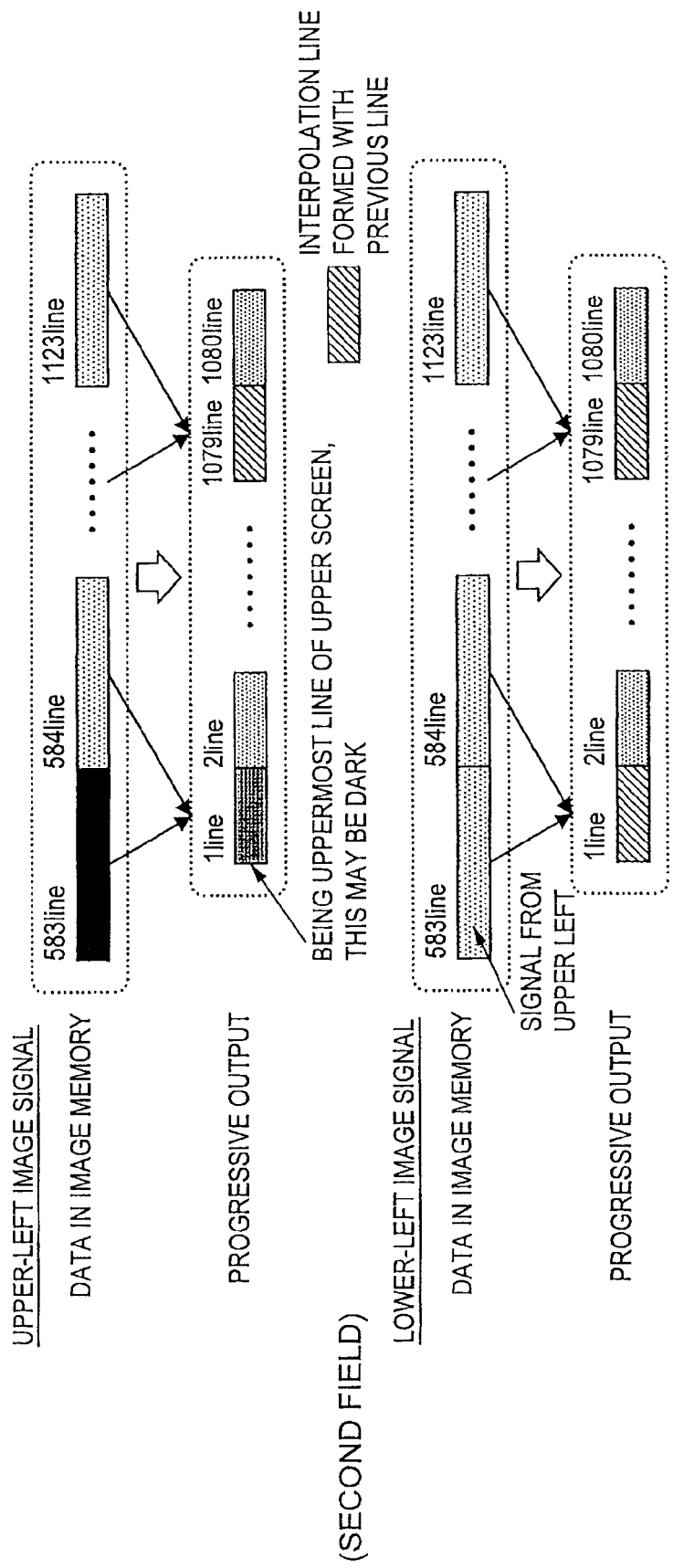

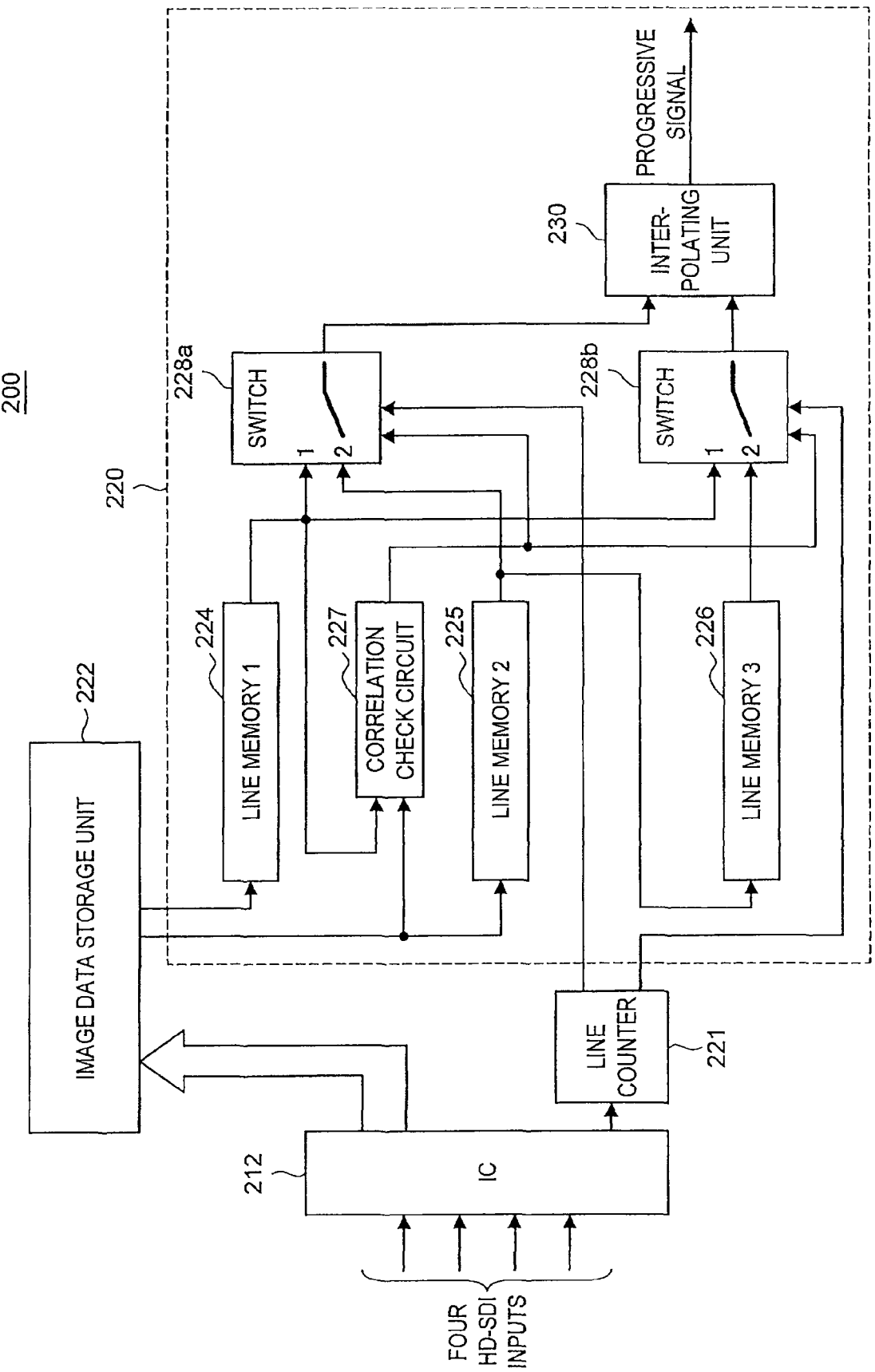

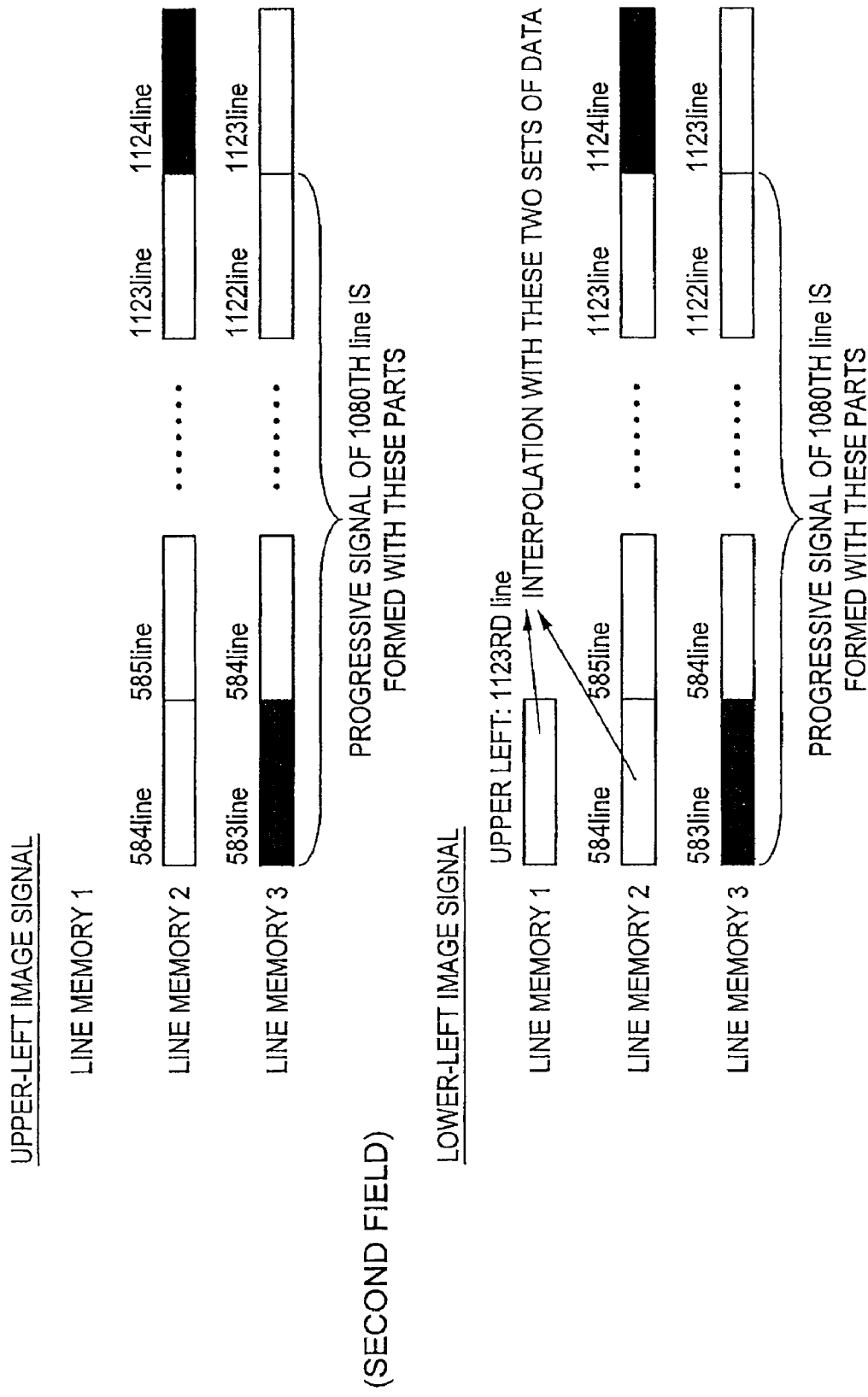

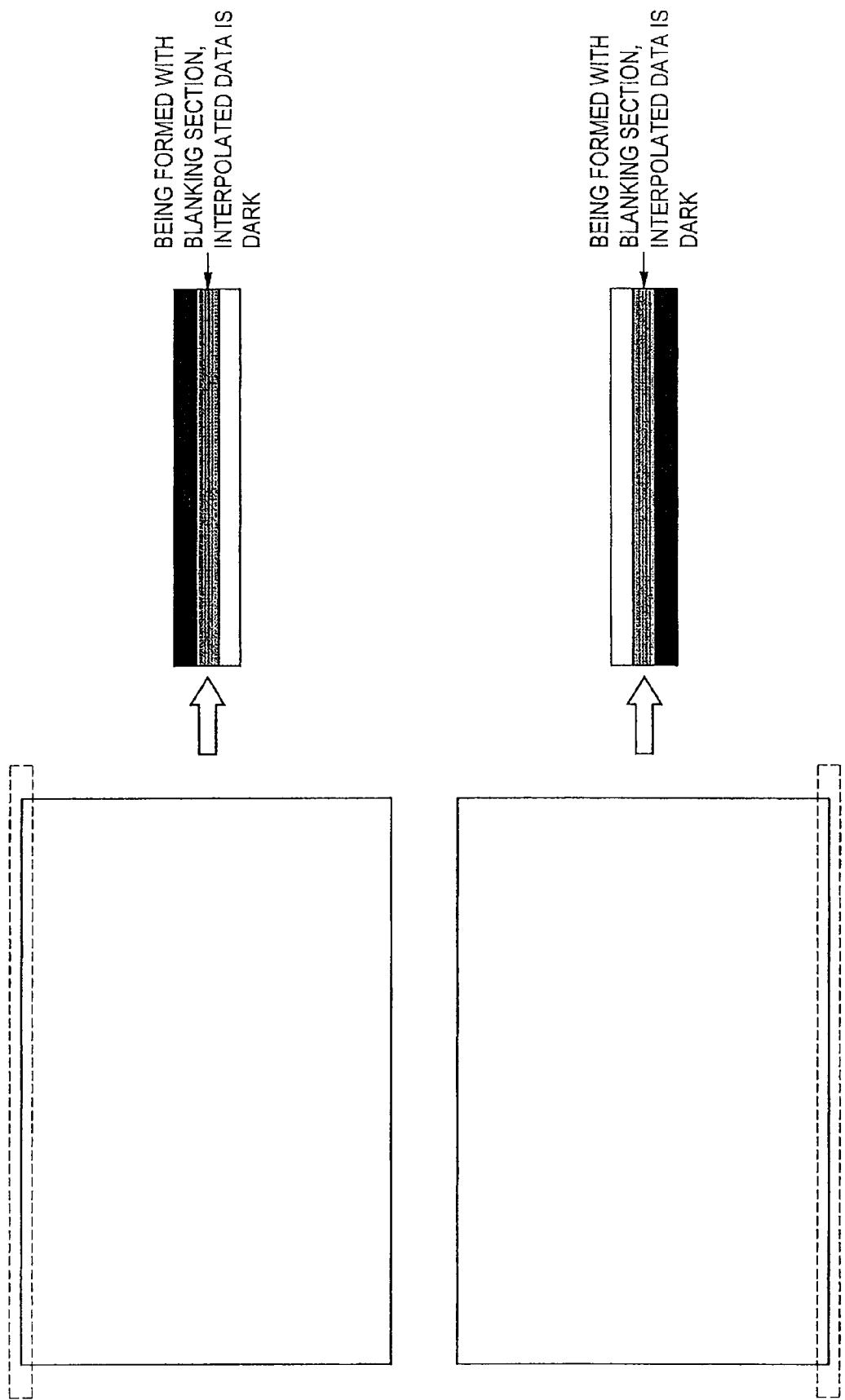

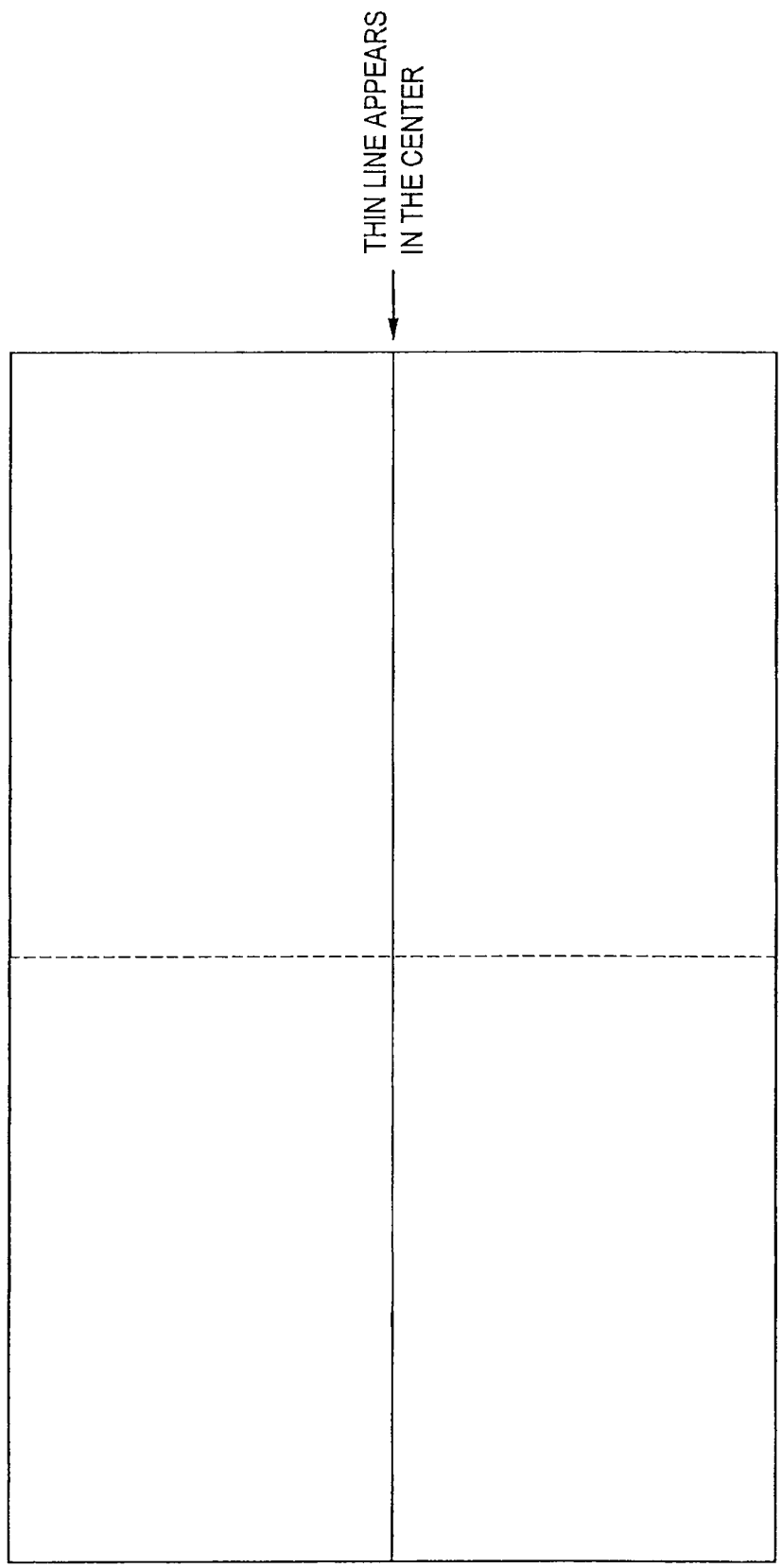

VIDEO SIGNAL PROCESSING APPARATUS, METHOD, AND COMPUTER PROGRAM PRODUCT FOR CONVERTING INTERLACED VIDEO SIGNALS INTO PROGRESSIVE VIDEO SIGNALS

CROSS-REFERENCE TO RELATED APPLICATION

The present invention contains subject matter related to Japanese Patent Application JP 2008-60332 filed in the Japan Patent Office on Mar. 10, 2008, the entire contents of which being incorporated herein by reference.

BACKGROUND OF THE INVENTION

1. Field of the Invention

The present invention relates to a video signal processing apparatus, a video signal processing method, and a computer program product, and, more particularly, to a video signal processing apparatus, a video signal processing method, and a computer program product for converting interlaced video signals into progressive video signals.

2. Description of the Related Art

Liquid display devices and organic EL (Electro-Luminescence) display devices display video images by a frame-hold-type display processing, unlike display devices using CRTs (Cathode Ray Tubes). For example, a display device that operates at the regular frame frequency of 60 Hz displays an image in a frame-hold-type display processing, holding one image on the entire screen in every display period in one frame.

Many broadcast signals for displaying video images are generated by the interlace method compatible with display devices using CRTs. When an image is displayed with interlaced broadcast signals on a display device using a CRT, each one image to be displayed on the horizontal scanning lines of the CRT is formed with two fields. In the first field of the two fields, the horizontal scanning lines are scanned every other line from the uppermost horizontal scanning line of the screen. When the scanning reaches the lower-end horizontal scanning line, the horizontal scanning lines that have not been scanned in the first field are scanned every other line from the top of the screen. In this manner, the image of one frame is displayed.

When an image is displayed on a display device that displays an image in a frame-hold-type display processing such as a liquid crystal display device or an organic EL display device using interlaced broadcast signals (hereinafter also referred to simply as "interlaced signals"), a line that carries data to be displayed on the screen and a line that does not carry data alternately appear in each display frame, and many flickers are caused. As a result, the luminance is halved. To counter this issue, an operation to convert interlaced signal into progressive broadcast signals (hereinafter also referred to simply as "progressive signals") is performed in each display device that displays an image in a frame-hold-type display processing. The operation to convert interlaced signals into progressive signals is generally called an I-P converting operation.

The progressive method is a method for displaying a screen by scanning the scanning lines forming the screen one by one from the top. Accordingly, by the progressive method, the signals corresponding to all the scanning lines are provided in one frame. By the interlace method, the horizontal scanning lines are scanned every other line. Therefore, it is necessary to generate signals for the scanning lines that are not scanned by the interlace method. This is the I-P converting operation.

In a case where it is difficult to use the data from the previous and later fields in an I-P converting operation as the movement is large as in moving pictures, the signals of the scanning lines that are not scanned by the interlace method are generated through an interpolating operation. FIG. 13 schematically shows the interpolating operation involving the I-P conversion. As shown in FIG. 13, the signal of the scanning line that is not scanned is generated by performing the interpolating operation with the use of the signals of the scanning lines located above and below the scanning line that is not scanned.

In recent years, attention is drawn to display devices that display images with liquid crystal displays or projectors, inputting interlaced signals of several screens (for example, two screens in the vertical direction and two screens in the horizontal direction). The interlaced signals used in such display devices can display superfine images, like HD-SDI (High Definition-Serial Digital Interface) signals including signals of 1125 lines in the vertical direction. In such display devices, a superfine image can be displayed on a wide screen by inputting video signals of several screens.

SUMMARY OF THE INVENTION

In a case where it is difficult to use the data from the previous and later fields in an I-P converting operation as the movement is large as in moving pictures, the data of the line in between is generated by performing an interpolating operation on the data of two lines in the subject field being processed. However, on the boundary between an upper pixel and a lower pixel, an interpolating operation is performed with the use of the data of a blanking region. FIG. 14 schematically shows the interpolating operation involving an I-P conversion on the boundary between an upper pixel and a lower pixel. As can be seen from FIG. 14, the generated data through the interpolating operation on the boundary between an upper pixel and a lower pixel is darker than the other lines.

In the case of a single screen, there is not an issue even if darker data than the other lines is generated as a result of an interpolating operation on the boundary between an upper pixel and a lower pixel. However, when the image data of two screens in the vertical direction and two screens in the horizontal direction are input and are subjected to an I-P converting operation, an image having a thin, dark line at the horizontal boundary region of each screen is displayed as shown in FIG. 15.

The present invention has been made in view of the above circumstances, and it is desirable to provide a new and improved video signal processing apparatus, a video signal processing method, and a computer program product with which an image can be displayed without a thin, dark line appearing at the horizontal boundary portion even after an I-P converting operation is performed on the interlaced video signals for displaying several screens including screens adjacent to each other in the vertical direction.

According to an embodiment of the present invention, there is provided a video signal processing apparatus that includes: a video signal input unit that receives an input of interlaced video signals for displaying several screens including at least two screens adjacent to each other in a vertical direction, the input being on a screen-by-screen basis; and a converting unit that converts the input interlaced video signals into progressive video signals, the lowermost line of the valid image region in which an image is displayed through the interlaced video signals being converted with the use of the interlaced video signal corresponding to the uppermost line of the valid image region of a screen located below the subject screen when there exists the screen located below the subject screen, the uppermost line of the valid image region of the subject screen being converted with the use of the interlaced video signal corresponding to the lowermost line of the valid image region of a screen located above the subject screen when there exists the screen located above the subject screen.

With this structure, the converting unit receives the supply of the interlaced video signals that are input to the video signal input unit and are used to display the several screens including at least two screens adjacent to each other in the vertical direction. When converting the interlaced video signals into progressive video signals, the converting unit converts the lowermost line of the valid image region in which an image is displayed through the interlaced video signals with the use of the interlaced video signal corresponding to the uppermost line of the valid image region of a screen located below the subject screen if there exists such a screen, and converts the uppermost line of the valid image region of the subject screen with the use of the interlaced video signal corresponding to the lowermost line of the valid image region of a screen located above the subject screen if there exists such a screen. As a result, even after an I-P converting operation is performed on the interlaced video signals for displaying the screens including two screens adjacent to each other in the vertical direction, an image can be displayed without a thin, dark line appearing at the horizontal boundary portion of the screen.

The converting unit may include: an image data storage unit that stores the interlaced video signals of all the lines of the valid image region of the subject screen and the interlaced video signals of a predetermined number of lines counted downward from the uppermost line of the valid image region of the screen located below the subject screen if there exists the screen located below the subject screen, and stores the interlaced video signals of all the lines of the valid image region of the subject screen and the interlaced video signals of a predetermined number of lines counted upward from the lowermost line of the valid image region of the screen located above the subject screen if there exists the screen located above the subject screen, the interlaced video screens being stored on a screen-by-screen basis; and an interpolating unit that converts the interlaced video signals stored on a screen-by-screen basis in the image data storage unit into the progressive video signals. With this arrangement, some of the interlaced video signals are obtained from the screens adjacent to each other in the vertical direction, and are stored into the image data storage unit. Accordingly, even after an I-P converting operation is performed on the interlaced video signals for displaying the screens including the two screens adjacent to each other in the vertical direction, an image can be displayed without a thin, dark line appearing at the horizontal boundary portion of the screen.

The video signal processing apparatus may further include a correlation check unit that determines whether there is a correlation between the lowermost line of the valid image region of the upper one of two screens adjacent to each other in the vertical direction and the uppermost line of the valid image region of the lower screen, and, if there is not a correlation, performs a control operation so that the interlaced video signals from the adjacent screen are not stored into the image data storage unit.

The video signal processing apparatus may further include: a line measuring unit that measures the position of the subject line before an interlaced video signal is stored into the image data storage unit; and a switching unit that is switched so that the interlaced video signal is stored into the image data storage unit corresponding to the screen located above or below the subject screen when the measurement value of the line measuring unit becomes equal to a predetermined value.

The converting unit may include: an image data storage unit that stores the interlaced video signals that are input to the video signal input unit; a first line data storage unit that temporarily and sequentially stores line by line the interlaced video signals stored in the image data storage unit; a second line data storage unit that sequentially stores the interlaced video signals of the line next to the line stored in the first line data storage unit; a third line data storage unit that stores the interlaced video signal corresponding to the uppermost line of the valid image region of the screen located below the subject screen or the interlaced video signal corresponding to the lowermost line of the valid image region of the screen located above the subject screen; and an interpolating unit that converts the interlaced video signals into the progressive video signals, the interlaced video signal of the uppermost line of the valid image region of the subject screen or the lowermost line of the valid image region of the subject screen being converted into a progressive video signal with the use of the interlaced video signal stored in the first line data storage unit or the second line data storage unit and the interlaced video signal stored in the third line data storage unit, the interlaced video signal of a line other than the uppermost line of the valid image region of the subject screen or a line other than the lowermost line of the valid image region of the subject screen being converted into a progressive video signal with the use of the interlaced video signal stored in the first line data storage unit and the interlaced video signal stored in the second line data storage unit. With this arrangement, the interlaced video signals to be subjected to an interpolating operation are switched in predetermined timing, and are then supplied to the interpolating unit. Accordingly, even after an I-P converting operation is performed on the interlaced video signals for displaying the screens including the two screens adjacent to each other in the vertical direction, an image can be displayed without a thin, dark line appearing at the horizontal boundary portion of the screen.

The video signal processing apparatus may further include a correlation check unit that determines whether there is a correlation between the lowermost line of the valid image region of the upper one of two screens adjacent to each other in the vertical direction and the uppermost line of the valid image region of the lower screen, and, if there is not a correlation, controls the interpolating unit to perform a converting operation using the interlaced video signal stored in the first line data storage unit and the interlaced video signal stored in the second line data storage unit.

The video signal processing apparatus may further include: a line measuring unit that measures the position of the line of an interlaced video signal to be subjected to a converting operation before the interlaced video signal is converted into a progressive video signal at the interpolating unit; and a switching unit that is switched so that the interpolating unit performs a converting operation on the interlaced video signal stored in the third line data storage unit, when the measurement value of the line measuring unit becomes equal to a predetermined value.

According to another embodiment of the present invention, there is provided a video signal processing method that includes the steps of: receiving an input of interlaced video signals for displaying several screens including at least two screens adjacent to each other in the vertical direction, the input being on a screen-by-screen basis; and converting the interlaced video signals into progressive video signals, the lowermost line of a valid image region in which an image is displayed through the interlaced video signals being converted with the use of the interlaced video signal corresponding to the uppermost line of the valid image region of a screen located below the subject screen if there exists the screen located below the subject screen, the uppermost line of the valid image region of the subject screen being converted with the use of the interlaced video signal corresponding to the lowermost line of the valid image region of a screen located above the subject screen if there exists the screen located above the subject screen.

According to another embodiment of the present invention, there is provided a computer program product that causes a computer to perform the steps of: receiving an input of interlaced video signals for displaying several screens including at least two screens adjacent to each other in the vertical direction, the input being on a screen-by-screen basis; and converting the interlaced video signals into progressive video signals, the lowermost line of a valid image region in which an image is displayed through the interlaced video signals being converted with the use of the interlaced video signal corresponding to the uppermost line of the valid image region of a screen located below a subject screen if there exists the screen located below the subject screen, the uppermost line of the valid image region of the subject screen being converted with the use of the interlaced video signal corresponding to the lowermost line of the valid image region of a screen located above the subject screen if there exists the screen located above the subject screen.

As described above, the present invention can provide a new and improved video signal processing apparatus, a video signal processing method, and a computer program product with which an image can be displayed without a thin, dark line appearing at the horizontal boundary portion of the screen, as an interpolating operation is performed with the use of the interlaced signals of screens adjacent to each other in the vertical direction when an I-P converting operation is performed on the interlaced video signals for displaying several screens including screens adjacent to each other in the vertical direction.

BRIEF DESCRIPTION OF THE DRAWINGS

FIG. 5 illustrates the gist of the I-P converting operation to be performed by the converting unit 120 according to the first embodiment of the present invention;

FIG. 6 illustrates the structure of the video signal processing apparatus 100 according to the first embodiment of the present invention;

FIG. 7 illustrates a signal processing method using the video signal processing apparatus 100 according to the first embodiment of the present invention;

FIG. 8A schematically shows the flow of the signals of the first field of HD-SDI signals to be supplied to the video signal processing apparatus 100 according to the first embodiment of the present invention;

FIG. 8B schematically shows the flow of the signals of the second field of HD-SDI signals to be supplied to the video signal processing apparatus 100 according to the first embodiment of the present invention;

FIG. 10A illustrates the I-P converting operation to be performed on the signals of the first field;

FIG. 10B illustrates the I-P converting operation to be performed on the signals of the second field;

FIG. 11 illustrates the structure of a video signal processing apparatus 200 according to a second embodiment of the present invention;

FIG. 12B illustrates another flow of HD-SDI signals to be supplied to the video signal processing apparatus 200 according to the second embodiment of the present invention;

FIG. 14 schematically shows an interpolating operation involving an I-P conversion on the boundary between pixels adjacent to each other in the vertical direction; and FIG. 15 schematically shows a case where an image having a thin, dark line at a horizontal boundary portion is displayed.

DETAILED DESCRIPTION OF THE INVENTION

Figure 1:
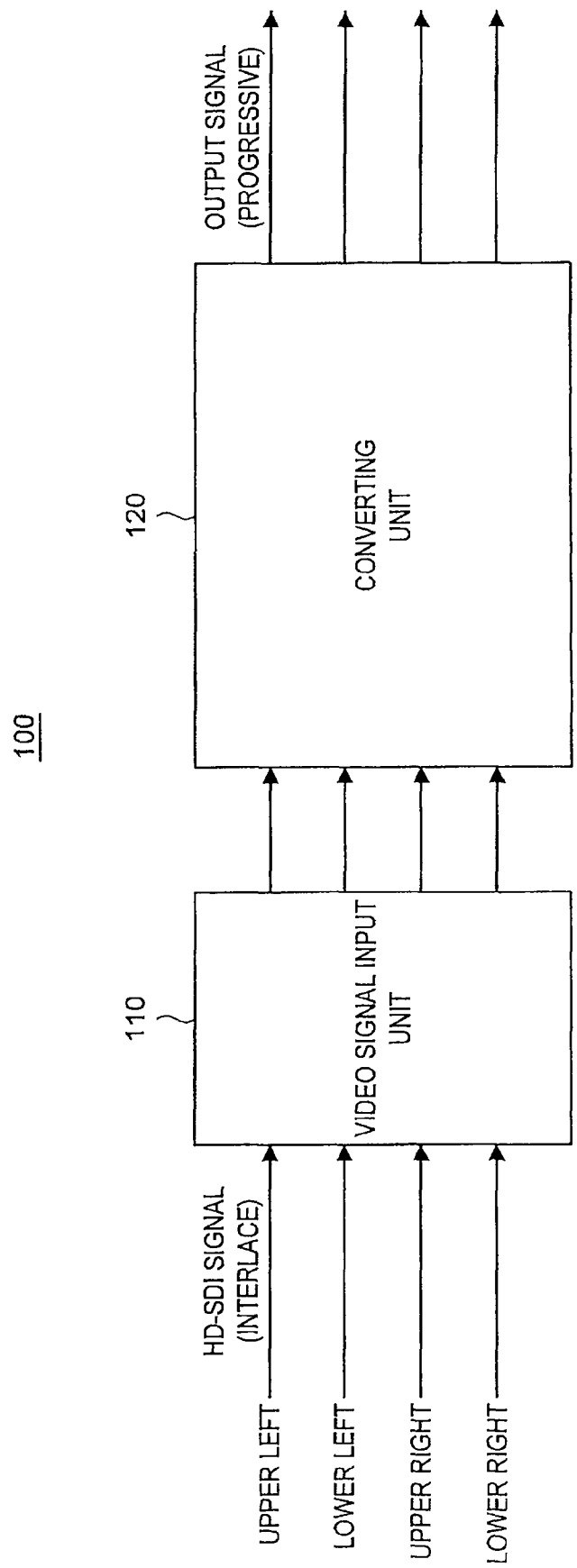
FIG. 1 illustrates the structure of a video signal processing apparatus 100 according to a first embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

First Embodiment

First, a video signal processing apparatus according to a first embodiment of the present invention is described. FIG. 1 illustrates the structure of the video signal processing apparatus in accordance with the first embodiment of the present invention. The following is a description of the structure of the video signal processing apparatus 100 in accordance with the first embodiment of the present invention.

The video signal processing apparatus 100 generates and outputs images of screens from the interlaced signals of the screens. As shown in FIG. 1, the video signal processing apparatus 100 in accordance with the first embodiment of the present invention includes a video signal input unit 110 and a converting unit 120.

The video signal input unit 110 receives inputs of the interlaced signals of the screens on a screen-by-screen basis. In this embodiment, the video signal input unit 110 receives the HD-SDI signals of four screens, two in the vertical direction and two in the horizontal direction, on a screen-by-screen basis. The video signal input unit 110 outputs the input HD-SDI signals to the converting unit 120 in the later stage on a screen-by-screen basis.

The converting unit 120 receives the interlaced signals output from the video signal input unit 110, and performs an I-P converting operation to convert the interlaced signals into progressive signals on a screen-by-screen basis. The converting unit 120 then outputs the progressive signals. In this embodiment, the converting unit 120 receives the HD-SDI signals of 1125 lines in the vertical direction from the video signal input unit 110, and performs an I-P converting operation on the HD-SDI signals. The converting unit 120 then outputs the progressive signals of 1080 lines in the vertical direction.

Figure 2:
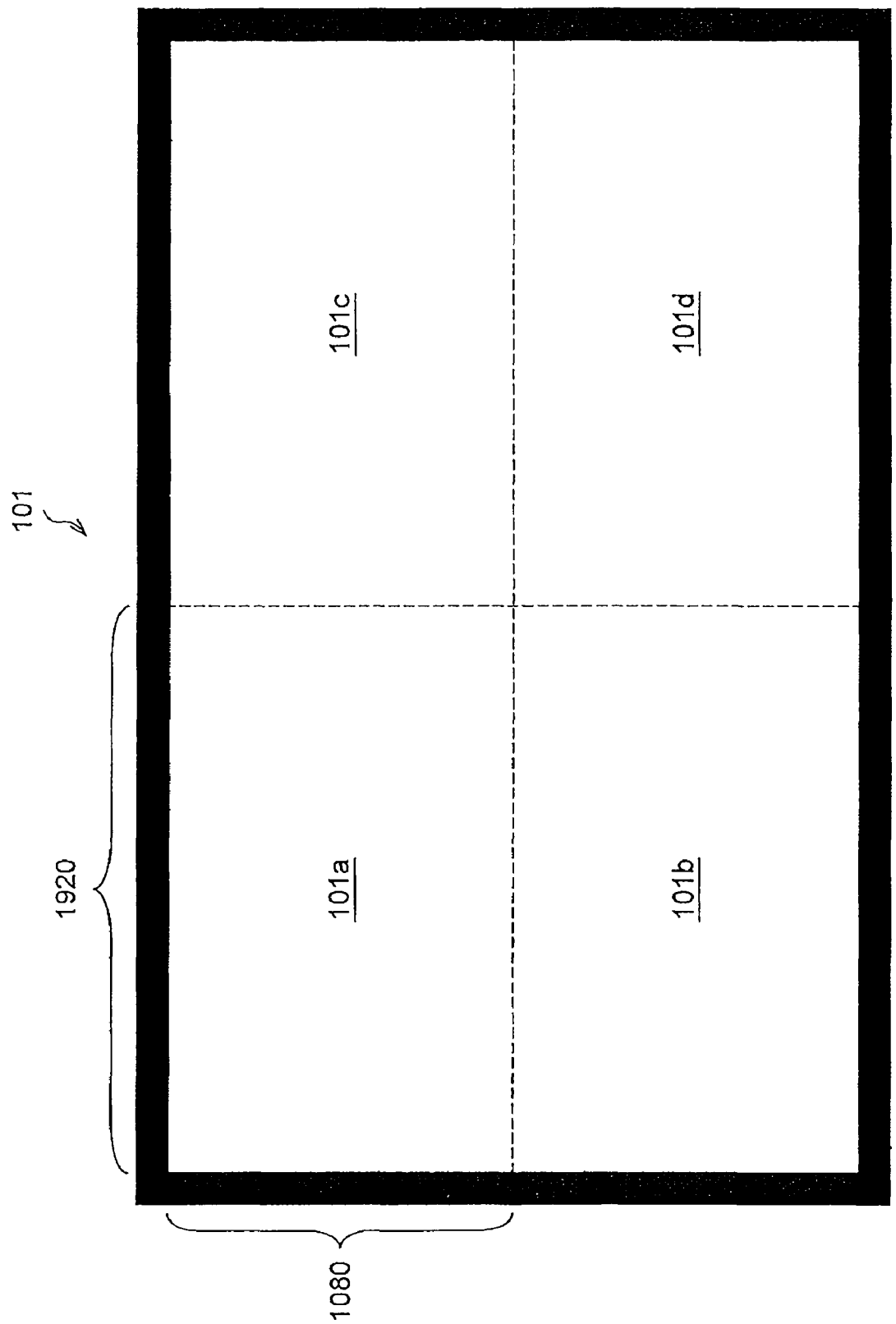
FIG. 2 schematically shows the screen that is displayed as a result of an I-P converting operation performed in the video signal processing apparatus 100 according to the first embodiment of the present invention.

FIG. 2 schematically shows the displayed screen because of an I-P converting operation performed by the video signal processing apparatus 100 in accordance with the first embodiment of the present invention. As shown in FIG. 2, when an I-P converting operation is performed on HD-SDI signals of four screens by the video signal processing apparatus 100 in accordance with the first embodiment of the present invention, images of four screens, two in the vertical direction and two in the horizontal direction, are displayed as shown in the screen 101. The screen 101 includes an upper-left screen 101a, a lower-left screen 101b, an upper-right screen 101c, and a lower-right screen 101d.

As described above, when the HD-SDI signals of four screens are simply subjected to an I-P converting operation and are then output, a thin, dark line appears on the boundary between the upper-left screen 101a and the lower-left screen 101b, and on the boundary between the upper-right screen 101c and the lower-right screen 101d in the screen 101. To counter this issue, the I-P converting operation is performed by the converting unit 120, so that no lines appear on the boundary between the upper-left screen 101a and the lower-left screen 101b, and on the boundary between the upper-right screen 101c and the lower-right screen 101d in the screen 101 in the first embodiment of the present invention.

In the screen 101 shown in FIG. 2, the upper-left screen 101a, the lower-left screen 101b, the upper-right screen 101c, and the lower-right screen 101d each have the resolution of 1080 pixels in the vertical direction and 1920 pixels in the horizontal direction. In the present invention, the number of pixels in each screen and the number of screens of the screen 101 are not limited to the above examples.

Figure 3:
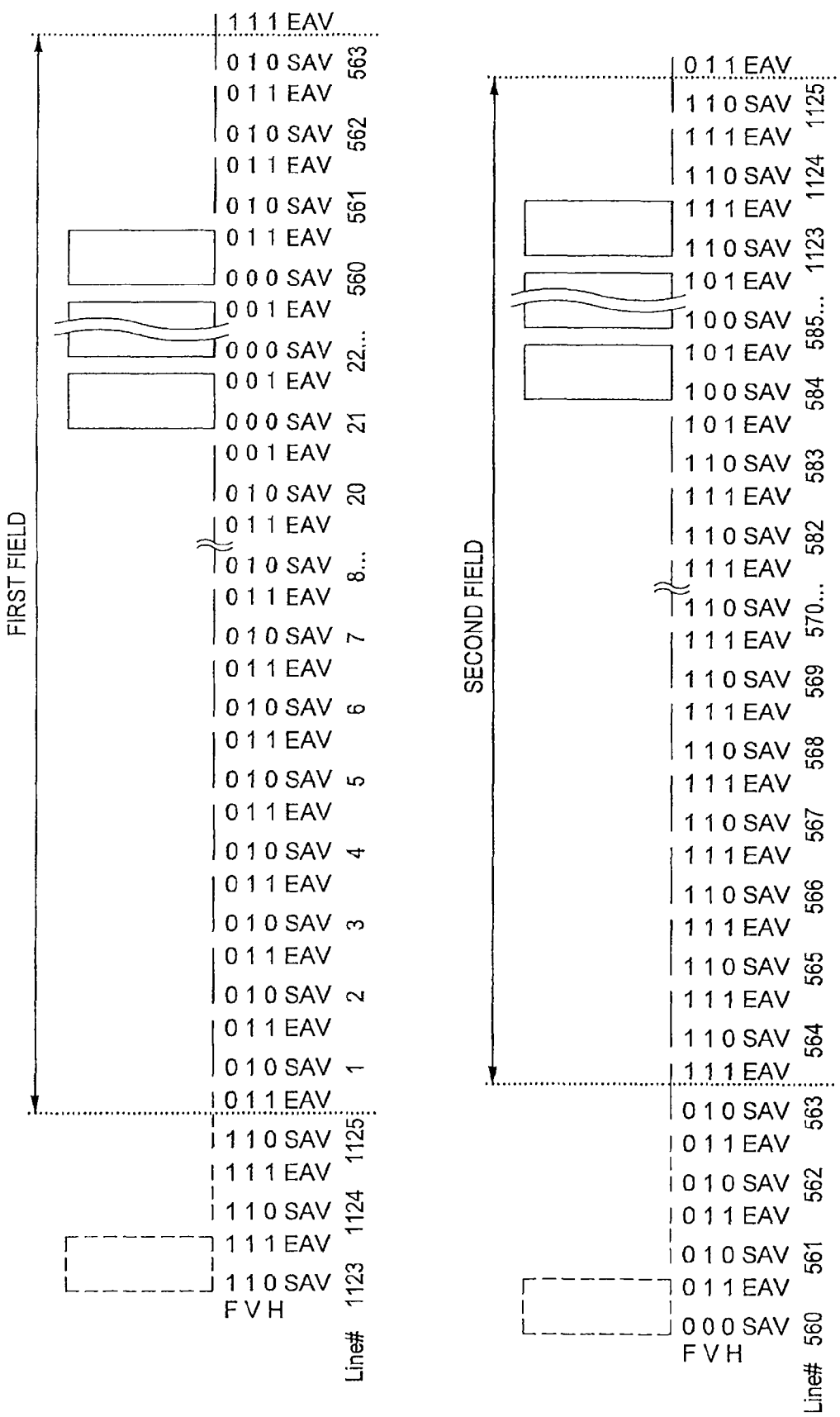
FIG. 3 shows the signal specification of HD-SDI signals.

The signal specification of the HD-SDI signals subjected to the I-P converting operation in this embodiment is now described. FIG. 3 illustrates the signal specification of the HD-SDI signals. As shown in FIG. 3, 1125 lines of the HD-SDI signals are transmitted in one frame. The 1125 lines of the HD-SDI signals are divided into two fields. Hereinafter, the first line through the 563rd line will be referred to as the first field, and the 564th line through the 1125th line will be referred to as the second field.

In the first field, the first line through the 20th line and the 561st line through the 563rd line are the periods during which no images are displayed on the screen (the blanking period), and the 21st line through the 560th line are the period during which images are displayed on the screen. In the second field, the 564th line through the 583rd line and the 1124 and 1125 lines are the periods during which no images are displayed on the screen (the blanking periods), and the 584 line through the 1123rd line are the period during which images are displayed on the screen. The regions in which images are displayed during the periods other than the blanking periods will also be hereinafter referred to as the "valid image regions".

In a regular I-P converting operation, the signals of the lines between the 21st line and the 22nd line, between the 22nd line and the 23rd line, . . . , and between the 560th line and the 561st line are generated through an interpolating operation in the first field for the HD-SDI signals shown in FIG. 3. In the second field, the signals of the lines between the 583rd line and the 584th line, between the 584th line and the 585th line, . . . , and between the 1122nd line and the 1123rd line are generated through an interpolating operation.

However, the 561st line and the 583rd line of the HD-SDI signals are located in the blanking periods during which no images are displayed on the screen. Therefore, if an interpolating operation is performed on HD-SDI signals with the use of the data of the blanking periods, the generated data is darker than the other lines, as described above.

In a case where there is an adjacent screen existing below the subject screen (for example, the cases of the upper-left screen 101a and the upper-right screen 101c shown in FIG. 2), when the signal of the line between the 560th line and the 561st line is to be generated, it is necessary to generate such data that the line to be generated is not darker than the other lines. Likewise, in a case where there is an adjacent screen existing above the subject screen (for example, the cases of the lower-left screen 101b and the lower-right screen 101d shown in FIG. 2), when the signal of the line between the 583rd line and the 584th line is to be generated, it is necessary to generate such data that the line to be generated is not darker than the other lines.

The signal specification of the HD-SDI signals has been described above. Next, the gist of the I-P converting operation to be performed by the converting unit 120 in accordance with the first embodiment of the present invention is described.

Figure 4:
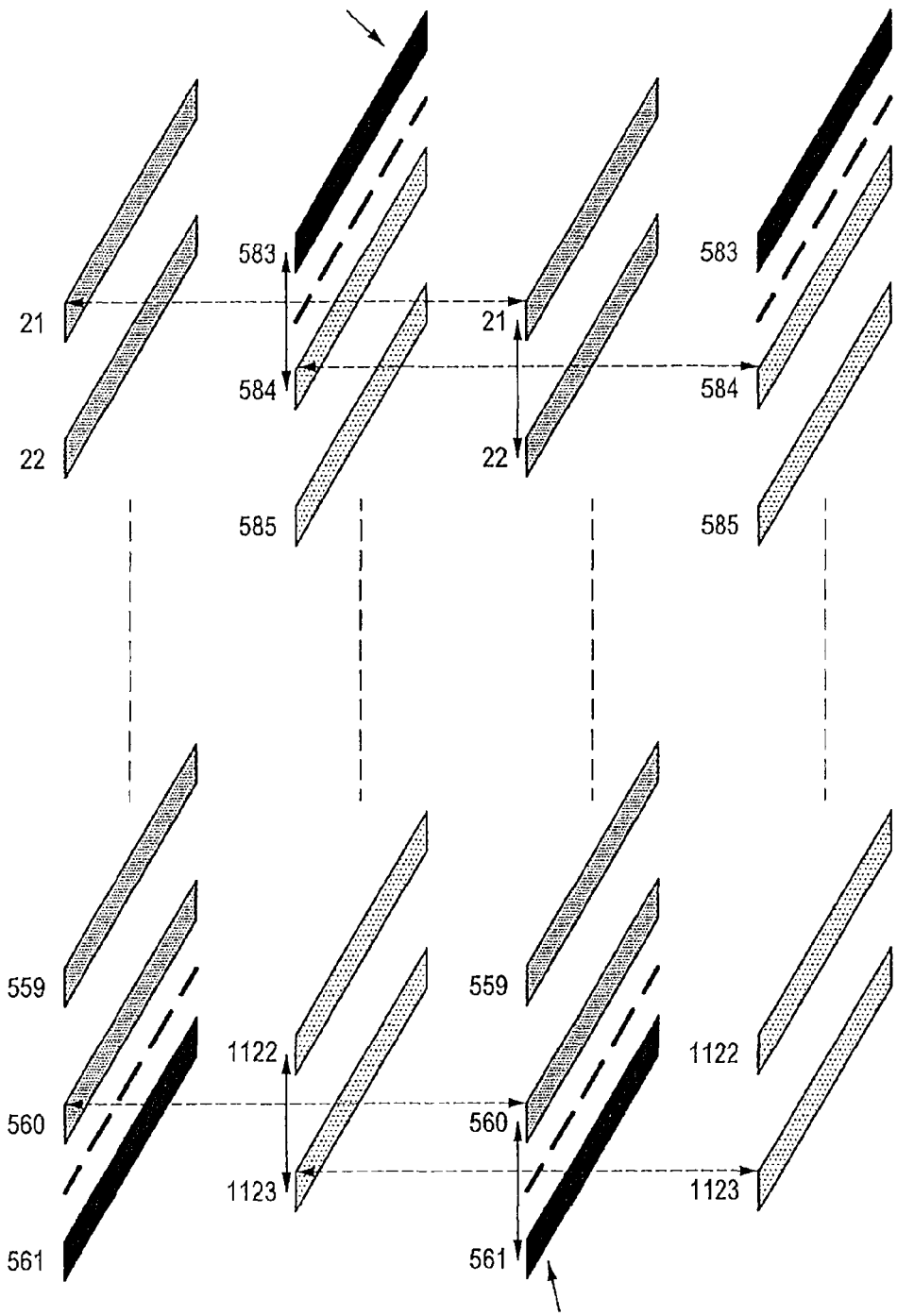
FIG. 4 illustrates the gist of an I-P converting operation to be performed by the converting unit 120 according to the first embodiment of the present invention.

FIGS. 4 and 5 illustrate the gist of the I-P converting operation to be performed by the converting unit 120 according to the first embodiment of the present invention.

In the I-P converting operation to be performed by the converting operation 120 according to the first embodiment of the present invention, the data of the uppermost line (the 21st line) of the valid image region of the lower adjacent screen is required to generate the signal of the line between the 560th line and the 561st line in the first field, if there is an adjacent screen below the subject screen, as shown in FIG. 4. In other words, to generate the signal of the line between the 560th line and the 561st line in the first field, an interpolating operation is performed with the use of the data of the 560th line and the data of the 21st line of the lower adjacent screen, as shown in FIG. 5.

Likewise, the data of the lowermost line (the 1123rd line) of the valid image region of the upper adjacent screen is required to generate the signal of the line between the 583rd line and the 584th line in the second field, if there is an adjacent screen above the subject screen. In other words, to generate the signal of the line between the 560th line and the 561st line in the first field, an interpolating operation is performed with the use of the data of the 584th line and the data of the 1123rd line of the upper adjacent screen, as shown in FIG. 5.

By performing the I-P converting operation in the converting unit 120 in the above-described manner, a video data that does not become darker than the other lines can be generated. The following is a detailed description of the functional structure for performing a video signal processing operation according to the first embodiment of the present invention.

FIG. 6 illustrates the structure of the video signal processing apparatus according to the first embodiment of the present invention. Referring to FIG. 6, the structure of the video signal processing apparatus 100 according to the first embodiment of the present invention is described in detail.

As shown in FIG. 6, the video signal processing apparatus includes an upper-left image data storage unit 112a, a lower-left image data storage unit 112b, an upper-right image data storage unit 112c, a lower-right image data storage unit 112d, correlation check circuits 121a and 121b, lines counters 122a, 122b, 122c, and 122d, switches 123a, 123b, 123c, and 123d, an upper-left image memory 124a, a lower-left image memory 124b, an upper-right image memory 124c, a lower-right image memory 124d, and an interpolating unit 130.

The upper-left image data storage unit 112a, the lower-left image data storage unit 112b, the upper-right image data storage unit 112c, and the lower-right image data storage unit 112d receive the supplies of the HD-SDI signals for displaying the upper-left screen 101a, the lower-left screen 101b, the upper-right screen 101c, and the lower-right screen 101d shown in FIG. 2. The upper-left image data storage unit 112a, the lower-left image data storage unit 112b, the upper-right image data storage unit 112c, and the lower-right image data storage unit 112d form the video signal input unit 110 shown in FIG. 1, and may each include at least one line memory that can store the image data of one scanning line.

The HD-SDI signals stored in the upper-left image data storage unit 112a are output from the upper-left image data storage unit 112a line by line, and are supplied to the upper-left image memory 124a. The HD-SDI signal corresponding to the lowermost line of the valid image region of the upper-left screen 101a is supplied from the upper-left image data storage unit 112a to the lower-left image memory 124b in predetermined timing. While the HD-SDI signals stored in the upper-left image data storage unit 112a are supplied from the upper-left image data storage unit 112a to the upper-left image memory 124a line by line, the line counter 122a counts the lines of the HD-SDI signals.

The HD-SDI signals stored in the lower-left image data storage unit 112b are output from the lower-left image data storage unit 112b line by line, and are supplied to the lower-left image memory 124b. The HD-SDI signal corresponding to the uppermost line of the valid image region of the lower-left screen 101b is supplied from the lower-left image data storage unit 112b to the upper-left image memory 124a in predetermined timing. While the HD-SDI signals stored in the lower-left image data storage unit 112b are supplied from the lower-left image data storage unit 112b to the lower-left image memory 124b line by line, the line counter 122b counts the lines of the HD-SDI signals. The supplies of signals to the upper-left image memory 124a and the lower-left image memory 124b will be described later in detail.

Likewise, the HD-SDI signals stored in the upper-right image data storage unit 112c are output and are supplied line by line to the upper-right image memory 124c. The HD-SDI signals stored in the lower-right image data storage unit 112d are output and are supplied line by line to the lower-right image memory 124d. The HD-SDI signal corresponding to the lowermost line of the valid image region of the upper-right screen 101c is supplied to the lower-right image memory 124d in predetermined timing. The HD-SDI signal corresponding to the uppermost line of the valid image region of the lower-right screen 101d is supplied to the upper-right image memory 124c in predetermined timing.

The correlation check circuits 121a and 121b each check the correlation between the signals of two lines. More specifically, the correlation check circuit 121a checks the correlation between the signal of the lowermost line of the valid image region of the upper-left screen 101a and the signal of the uppermost line of the valid image region of the lower-left screen 101b. If the correlation check circuit 121a determines that there is a correlation as a result of a check made on the correlation between the signals of the two lines, the correlation check circuit 121a controls the lines counters 122a and 122b to supply the signal of the uppermost line of the valid image region of the lower-left screen 101b to the upper-left image memory 124a and the signal of the lowermost line of the valid image region of the upper-left screen 101a to the lower-left image memory 124b.

Likewise, the correlation check circuit 121b checks the correlation between the signal of the lowermost line of the valid image region of the upper-right screen 101c and the signal of the uppermost line of the valid image region of the lower-right screen 101d. If the correlation check circuit 121b determines that there is a correlation as a result of a check made on the correlation between the signal of the two lines, the correlation check circuit 121b controls the lines counters 122c and 122d to supply the signal of the uppermost line of the valid image region of the lower-left screen 101d to the upper-right image memory 124c and the signal of the lowermost line of the valid image region of the upper-right screen 101c to the lower-right image memory 124d.

If the correlation check circuits 121a and 121b determine that there is not a correlation between two lines, the screen adjacent to each other in the vertical direction are regarded as screens that are not related to each other, and the above described control is not performed on the signal supply.

The line counters 122a, 122b, 122c, and 122d count the lines of the HD-SDI signals supplied to the upper-left image memory 124a, the lower-left image memory 124b, the upper-right image memory 124c, and the lower-right image memory 124d, respectively. The switches 123a, 123b, 123c, and 123d control the supply source of the HD-SDI signals to be supplied to the upper-left image memory 124a, the lower-left image memory 124b, the upper-right image memory 124c, and the lower-right image memory 124d through switching operations.

The switches 123a, 123b, 123c, and 123d have the switching operations controlled by the values counted by the line counters 122a, 122b, 122c, and 122d. With the switching operations of the switches 123a, 123b, 123c, and 123d being controlled, the supplies of the HD-SDI signals to the upper-left image memory 124a, the lower-left image memory 124b, the upper-right image memory 124c, and the lower-right image memory 124d are controlled.

An example case of the line counter 122a is now described. When the signals of the first field among the HD-SDI signals are to be supplied from the upper-left image data storage unit 112a, the switch 123a is switched to store the HD-SDI signals supplied from the upper-left image data storage unit 112a into the upper-left image memory 124a, if the value counted by the line counter 122a falls between 21 and 560. If the value counted by the line counter 122a is 561, the switch 123a is switched to store the HD-SDI signal of the 21st line supplied from the lower-left image data storage unit 112b into the upper-left image memory 124a.

By controlling the switching of the switch 123a based on the value counted by the line counter 122a in this manner, the HD-SDI signals of the 21st line through the 560th line supplied from the upper-left image data storage unit 112a and the HD-SDI signal of the 21st line supplied from the lower-left image data storage unit 112b can be stored into the upper-left image memory 124a.

If the correlation check circuit 121a determines that there is not a correlation between the HD-SDI signal of the 560th line supplied from the upper-left image data storage unit 112a and the HD-SDI signal of the 21st line supplied from the lower-left image data storage unit 112b, the line counter 122a may perform a control operation not to switch the switch 123a.

The upper-left image memory 124a, the lower-left image memory 124b, the upper-right image memory 124c, and the lower-right image memory 124d are memories that have the HD-SDI signals supplied from the upper-left image data storage unit 112a, the lower-left image data storage unit 112b, the upper-right image data storage unit 112c, and the lower-right image data storage unit 112d, respectively, and temporarily store the HD-SDI signals.

By switching the switches 123a, 123b, 123c, and 123d, a signal is also supplied from the lower-left image data storage unit 112*b* and is temporarily stored in the upper-left image memory 124*a*, a signal is also supplied from the upper-left image data storage unit 112*a* and is temporarily stored in the lower-left image memory 124*b*, a signal is also supplied from the lower-right image data storage unit 112*d* and is temporarily stored in the upper-right image memory 124*c*, and a signal is also supplied from the upper-right image data storage unit 112*c* and is temporarily stored in the lower-right image memory 124*d*.

The HD-SDI signals temporarily stored in the upper-left image memory 124*a*, the lower-left image memory 124*b*, the upper-right image memory 124*c*, and the lower-right image memory 124*d* are supplied to the interpolating unit 130 for the I-P converting operation.

The interpolating unit 130 receives the supplies of the HD-SDI signals stored in the upper-left image memory 124*a*, the lower-left image memory 124*b*, the upper-right image memory 124*c*, and the lower-right image memory 124*d*. The interpolating unit 130 generates a signal between two lines from the signals of the two lines through an interpolating operation. Through the interpolating operation performed by the interpolating unit 130, the HD-SDI signals that are interlaced signals are turned into progressive signals.

Since an interpolation method that is normally used for performing an I-P converting operation to convert an interlaced signal into a progressive signal can be used in the interpolating operation by the interpolating unit 130, explanation of the interpolating operation is omitted here.

The structure of the video signal processing apparatus 100 according to the first embodiment of the present invention has been described with reference to FIG. 6. Next, a signal processing method using the video signal processing apparatus 100 according to the first embodiment of the present invention shown in FIG. 6 is described in detail.

FIG. 7 illustrates the signal processing method using the video signal processing apparatus 100 according to the first embodiment of the present invention. Referring now to FIG. 7, the signal processing method using the video signal processing apparatus 100 according to the first embodiment of the present invention is described in detail.

FIG. 7 shows the flows of the upper-left image signal for displaying the upper-left screen 101*a* and the lower-left image signal for displaying the lower-left screen 101*b*. Accordingly, FIG. 7 shows only the portion required for explanation in the structure of the video signal processing apparatus 100 shown in FIG. 6. The first line memory 113*a* is the line memory contained in the upper-left image data storage unit 112*a*, and the second line memory 113*b* is the line memory contained in the lower-left image data storage unit 112*b*.

First, the flow of the signals of the first field of each frame among the HD-SDI signals is described. When the upper-left image signal and the lower-left image signal of the first field are to be supplied to the upper-left image memory 124*a* and the lower-left image memory 124*b*, respectively, the switches 123*a* and 123*b* are switched so as to supply the upper-left image signal and the lower-left image signal to the upper-left image memory 124*a* and the lower-left image memory 124*b*, respectively.

The signal of the 21st line of the lower-left image signal is temporarily stored in the second line memory 113*b* in desired timing, while the signals of the first field are being supplied to the upper-left image memory 124*a* and the lower-left image memory 124*b*.

If the signal of the last line (the 560th line) of the valid image region of the first field is determined to have been stored in the upper-left image memory 124*a* and the lower-left image memory 124*b* based on the count of the line counter 122*a*, the switch 123*a* is switched so as to supply the signal of the 21st line of the lower-left image signal stored beforehand in the second line memory 113*b* as the 561st line of the upper-left screen 101*a* to the upper-left image memory 124*a*.

FIG. 8A schematically shows the flow of the signals of the first field of the HD-SDI signals supplied to be to the video signal processing apparatus 100 according to the first embodiment of the present invention. In the first field, the signal of the 21st line of the lower-left image signal is stored in the second line memory 113*b*, as described above. When the signal of the 560th line of the upper-left image signal is supplied to the upper-left image memory 124*a*, the signal of the 21st line of the lower-left image signal stored beforehand in the second line memory 113*b* is supplied as the signal of the 561st line of the upper-left image signal to the upper-left image signal to the upper-left image memory 124*a*.

Next, the flow of the signals of the second field is described. As in the case of the first field, when the upper-left image signal and the lower-left image signal of the second field are to be supplied to the upper-left image memory 124*a* and the lower-left image memory 124*b*, respectively, the switches 123*a* and 123*b* are switched so as to supply the upper-left image signal and the lower-left image signal to the upper-left image memory 124*a* and the lower-left image memory 124*b*, respectively.

The signal of the 1123rd line of the upper-left image signal is stored in the first line memory 113*a* in desired timing, while the signals of the second field are being supplied to the upper-left image memory 124*a* and the lower-left image memory 124*b*.

If the signal of the last line (the 1123rd line) of the valid image region of the second field is determined to have been stored in the upper-left image memory 124*a* and the lower-left image memory 124*b* based on the count of the line counter 122*b*, the switch 123*b* is switched so as to supply the signal of the 1122nd line of the upper-left image signal stored beforehand in the first line memory 113*a* as the 563rd line of the upper-left screen 101*a* to the lower-left image memory 124*b*.

FIG. 8B schematically shows the flow of the signals of the second field of the HD-SDI signals to be supplied to the video signal processing apparatus 100 according to the first embodiment of the present invention. In the second field, the signal of the 1123rd line of the upper-left image signal is stored in the first line memory 113*a*, as described above. When the signal of the 1123rd line of the lower-left image signal is supplied to the upper-left image memory 124*a*, the signal of the 1123rd line of the lower-left image signal stored beforehand in the first line memory 113*a* is supplied as the signal of the 563rd line of the upper-left image signal to the upper-left image signal to the upper-left image memory 124*a*.

Figure 9:
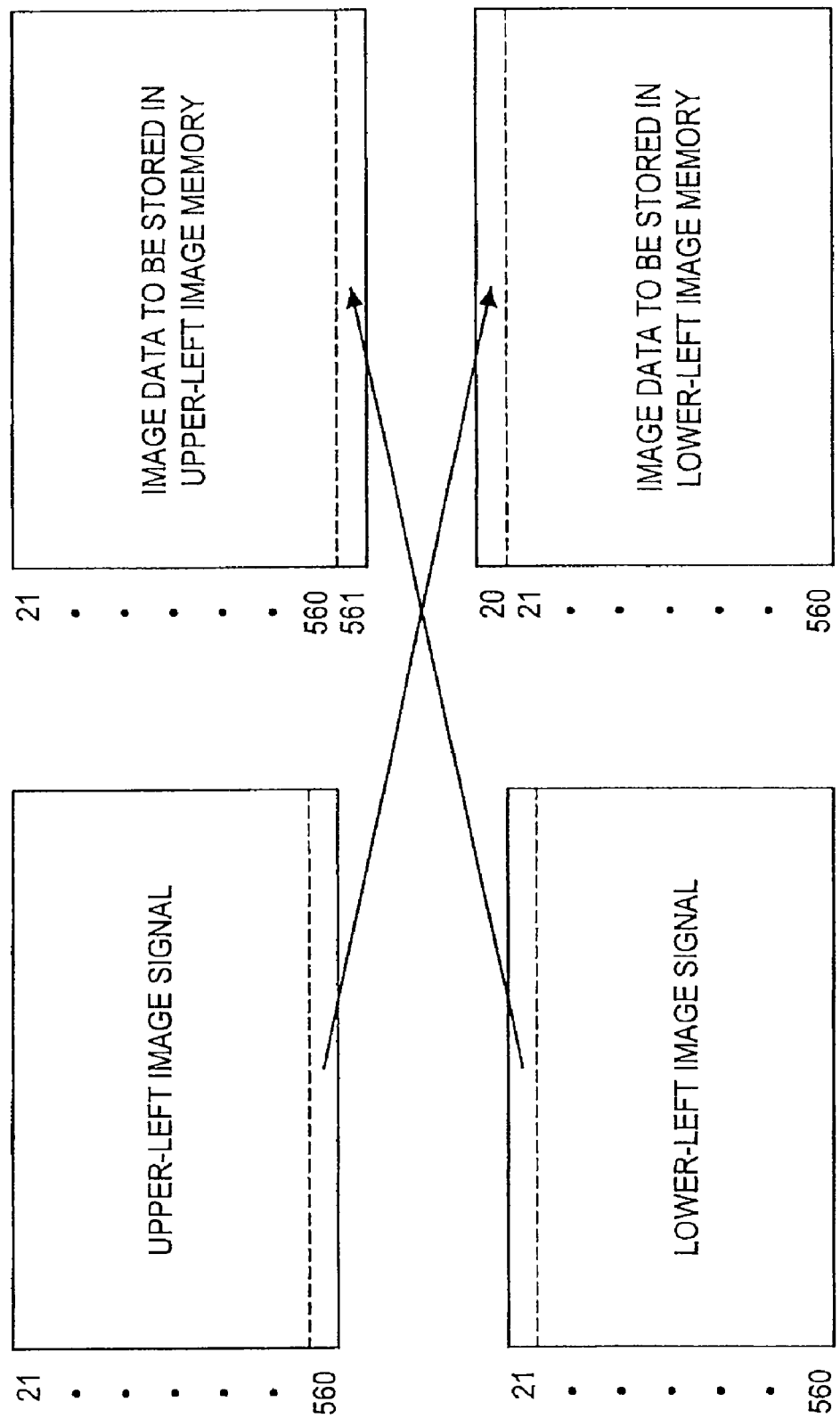
FIG. 9 schematically shows the signals to be stored into the upper-left image memory 124a and the lower-left image memory 124b.

The lowermost line or the uppermost line of the valid image region is temporarily stored in the first line memory 113*a* and the second line memory 113*b*, and is output to the upper-left image memory 124*a* and the lower-left image memory 124*b* in predetermined timing. By controlling the supplies of signals to the upper-left image memory 124*a* and the lower-left image memory 124*b* in this manner, HD-SDI signals that are one line more than the actual number of lines of the valid image region of the first field and the second field are stored in the upper-left image memory 124*a* and the lower-left image memory 124*b*, as shown in FIG. 9.

As described above, by performing an interpolating operation at the interpolating unit 130 using the HD-SDI signals stored in the upper-left image memory 124*a* and the lower-left image memory 124b, an I-P converting operation can be performed so that the lowermost line of the upper-left screen 101a and the uppermost line of the lower-left screen 101b do not become dark.

FIGS. 10A and 10B illustrate the gist of I-P converting operations to be performed with the use of the HD-SDI signals stored in the upper-left image memory 124a and the lower-left image memory 124b.

Referring now to FIG. 10A, the I-P converting operation to be performed on the signals of the first field of the HD-SDI signals to be supplied to the video signal processing apparatus 100 according to the first embodiment of the present invention is described. The second line of the progressive signals is generated through an interpolating operation using the signals of the 21st line and the 22nd line of the HD-SDI signals. Likewise, the fourth line is generated through an interpolating operation using the signals of the 22nd line and the 23rd line of the HD-SDI signals, and the sixth line is generated through an interpolating operation using the signals of the 23rd line and the 24th line of the HD-SDI signals.

The 1080th line is generated through an interpolating operation using the signals of the 560th line and the 561st line of the HD-SDI signals. Here, the signal of the 561st line of the upper-left image signal is normally of a blanking period, but is the signal of the 21st line of the lower-left image signal in this embodiment. Accordingly, by the signal processing method according to this embodiment, it is possible to generate the progressive signal of the 1080th line of the upper-left image 101a that does not become dark.

Meanwhile, the signal of the 561st line of the lower-left image signal is of a blanking period. Accordingly, the progressive signal of the 1080th line of the lower-left screen 101b is as dark as in related art. However, since the lowermost line of the lower-left screen 101b is the lowermost line of the screen 101, the progressive signal of the 1080th line of the lower-left screen 101b can be as dark as in related art.

Referring now to FIG. 10B, the I-P converting operation to be performed on the signals of the second field of the HD-SDI signals to be supplied to the video signal processing apparatus 100 according to the first embodiment of the present invention is described. The third line of the progressive signals is generated through an interpolating operation using the signals of the 584th line and the 585th line of the HD-SDI signals. Likewise, the fifth line is generated through an interpolating operation using the signals of the 585th line and the 586th line of the HD-SDI signals, and the seventh line is generated through an interpolating operation using the signals of the 586th line and the 587th line of the HD-SDI signals. Thereafter, progressive signals are generated down to the 1079th line.

The first line is generated through an interpolating operation using the signals of the 583rd line and the 584th line of the HD-SDI signals. Here, the signal of the 583rd line of the lower-left image signal is normally of a blanking period, but is the signal of the 1123rd line of the upper-left image signal in this embodiment. Accordingly, by the signal processing method according to this embodiment, it is possible to generate the progressive signal of the first line of the lower-left image 101b that does not become dark.

Meanwhile, the signal of the first line of the upper-left image signal is of a blanking period. Accordingly, the progressive signal of the first line of the upper-left screen 101a is as dark as in related art. However, since the uppermost line of the upper-left screen 101a is also the uppermost line of the screen 101, the progressive signal of the first line of the upper-left screen 101a can be as dark as in related art.

If the correlation check circuit 121a makes a correlation check and determines that there is not a correlation between the lowermost line of the valid image region of the upper-left image signal and the uppermost line of the valid image region of the lower-left image signal, the switches 123a and 123b may be controlled so as not to be switched.

An example of the method for checking the correlation between two lines at the correlation check circuit 121a is now described. For example, all data is assigned to the following equation:

$$x_{th} = \Sigma(x\_upper_i - x\_lower_i)$$

where $x\_upper_i$ represents the ith data of the upper line, and $x\_lower_i$ represents the ith data of the lower line. If the value $x_{th}$ is smaller than a predetermined value, the correlation check circuit 121a determines that there is a correlation between the two lines. If the value $x_{th}$ is not smaller than the predetermined value, the correlation check circuit 121a determines that there is not a correlation between the two lines, and may control the switches 123a and 123b so that the switches 123a and 123b are not to be switched.

Although operations to be performed in the case of the upper-left image signal and the lower-left image signal have been described above, the above signal processing method may also be used in the case of the upper-right image signal and the lower-right image signal.

The signal processing method using the video signal processing apparatus 100 according to the first embodiment of the present invention has been described so far.

As described above, according to the first embodiment of the present invention, when the image signals (the HD-SDI signals) of each screen are stored in each corresponding memory, the number of the lines of the stored signals is one larger than the actual number of lines. Accordingly, even after an I-P converting operation is performed on the line on the boundary between screens, the line on the boundary does not become dark. Thus, a screen that does not have a thin line appearing at its center can be displayed.

In the first embodiment of the present invention, operations are performed on an image formed with four screens, two in the vertical direction and two in the horizontal direction. However, it is possible to perform the same operation as above on an image including three or more screens in the vertical direction. For example, in a case where an I-P converting operation is performed on the middle one of three screens in the horizontal direction, the number of lines to be stored for the middle screen is one line each larger than the actual number of lines at the top and bottom. An interpolating operation is performed on the stored signals, so as to generate a progressive signal. In this manner, even after an I-P converting operation is performed on the line on the boundary between screens, the line on the boundary does not become dark.

Second Embodiment

The first embodiment of the present invention provides the video signal processing apparatus 100 and the video signal processing method using the video signal processing apparatus 100. According to the first embodiment, when the image signals (the HD-SDI signals) of each screen are stored in each corresponding memory, the number of the lines of the stored signals is one larger than the actual number of lines. Accordingly, even after an I-P converting operation is performed on the line on the boundary between screens, the line on the boundary does not become dark. A second embodiment of the present invention provides a video signal processing apparatus and a video signal processing method by which interlaced signals of several screens are buffered, the buffered data is read out line by line, and a different I-P converting operation is performed on the line on the boundary between screens.

FIG. 11 illustrates the structure of the video signal processing apparatus 200 according to the second embodiment of the present invention. The following is a description of the structure of the video signal processing apparatus 200 according to the second embodiment of the present invention.

As shown in FIG. 11, the video signal processing apparatus according to the second embodiment of the present invention includes an IC 212, a converting unit 220, a line counter 221, and an image data storage unit 222. The converting unit 220 includes a first line memory 224, a second line memory 225, a third line memory 226, a correlation check circuit 227, switches 228a and 228b, and an interpolating unit 230.

Like the video signal processing apparatus 100 according to the first embodiment of the present invention, the video signal processing apparatus 200 according to this embodiment is used to display a video image of four screens as shown in FIG. 2, based on the interlaced signals (HD-SDI signals) of the four screens, two in the vertical direction and two in the horizontal direction.

The IC 212 receives inputs of the interlaced signals (HD-SDI signals) of the four screens, and supplies the input signals to the image data storage unit 222. In an I-P converting operation by the converting unit 220, the IC 212 also outputs the signal for counting the line numbers allotted to the HD-SDI signals to be subjected to the I-P converting operation, to the line counter 221 in synchronization with the I-P converting operation.

The converting unit 220 performs an I-P converting operation on the interlaced signals (HD-SDI signals) stored in the image data storage unit 222, and generates progressive signals. Although the converting unit 220 shown in FIG. 11 is a single component, it is desirable to provide the same number of converting units 220 as the number of screen. Since the inputs of the interlaced signals of the four screens are received in this embodiment, it is desirable to prepare four converting units 220 corresponding to the interlaced signals for displaying the respective screens.

The line counter 221 counts the line numbers allotted to the HD-SDI signals to be subjected to the I-P converting operation performed by the converting unit 220. The counting of the line numbers by the line counter 221 is performed under the control of the IC 212. The line counter 221 starts counting under the control of the IC 212. When the count value reaches a predetermined value, the IC 212 performs a control operation to switch the terminals of the switches 228a and 228b.

The image data storage unit 222 temporarily stores the interlaced signals (HD-SDI signals) of the four screens. The HD-SDI signals stored in the image data storage unit 222 are read out line by line, and are subjected to the I-P converting operation at the converting unit 220.

The components forming the converting unit 220 are now described. Each of the first line memory 224, the second line memory 225, and the third line memory 226 is a memory into which one line of HD-SDI signals is stored from the image data storage unit 222.

The signal of the uppermost line or the lowermost line of the valid image region is stored in the first line memory 224. In an example case where an I-P converting operation is performed on the upper-left image signal at the converting unit 220, the signal of the uppermost line of the valid image region of the lower-left image signal is stored in the first line memory 224. The signal stored in the first line memory 224 is normally not used in the I-P converting operation performed on the upper-left image signal. When an I-P converting operation is performed on the lowermost line of the valid image signal of the upper-left image signal, a signal of a blanking region is normally used in the I-P converting operation. In this embodiment, however, the I-P converting operation is performed with the use of the signal of the uppermost line of the valid image region of the lower-left image signal stored in the first line memory 224.

One line of the HD-SDI signals stored in the image data storage unit 222 is stored into each of the second line memory 225 and the third line memory 226. The signal of the one line stored in the second line memory 225 is supplied to the interpolating unit 230 via the switch 228a, and is also supplied to the third line memory 226.

Accordingly, when the signal of the 21st line of the HD-SDI signals shown in FIG. 3 is stored into the second line memory 225, for example, the HD-SDI signals of the 22nd line are stored into the second line memory 225, and the HD-SDI signals of the 21st line are stored into the third line memory 226 in synchronization with the supply of the HD-SDI signals of the 22nd line.

The correlation check circuit 227 checks a correlation between the signal stored in the first line memory 224 and the signal stored in the second line memory 225. Based on the result of the correlation check, the correlation check circuit 227 controls the switching of the switches 228a and 228b. The method for checking a correlation at the correlation check circuit 227 may be the same as the method used at the correlation check circuits 121a and 121b according to the first embodiment of the present invention.

The switches 228a and 228b control the HD-SDI signals to be supplied to the interpolating unit 230. Normally, each of the switches 228a and 228b is switched to the terminal "2", so that the signal stored in the second line memory 225 and the signal stored in the third line memory 226 are supplied to the interpolating unit 230. However, one of the switches 228a and 228b is switched to the terminal "1" in predetermined timing, so that the HD-SDI signal stored in the first line memory 224 is supplied to the interpolating unit 230. The switching timings of the switches 228a and 228b will be described later in detail.

The interpolating unit 230 receives the supplies of HD-SDI signals from the first line memory 224, the second line memory 225, and the third line memory 226. The interpolating unit 230 then generates progressive signals through an interpolating operation, and outputs the progressive signals. The interpolating operation performed by the interpolating unit 230 may be the same as the interpolating operation performed by the interpolating unit 130 according to the first embodiment of the present invention.

The structure of the video signal processing apparatus 200 according to the second embodiment of the present invention has been described above. Next, the flows of the HD-SDI signals to be supplied to the video signal processing apparatus 200 according to the second embodiment of the present invention are described.

Figure 12A:
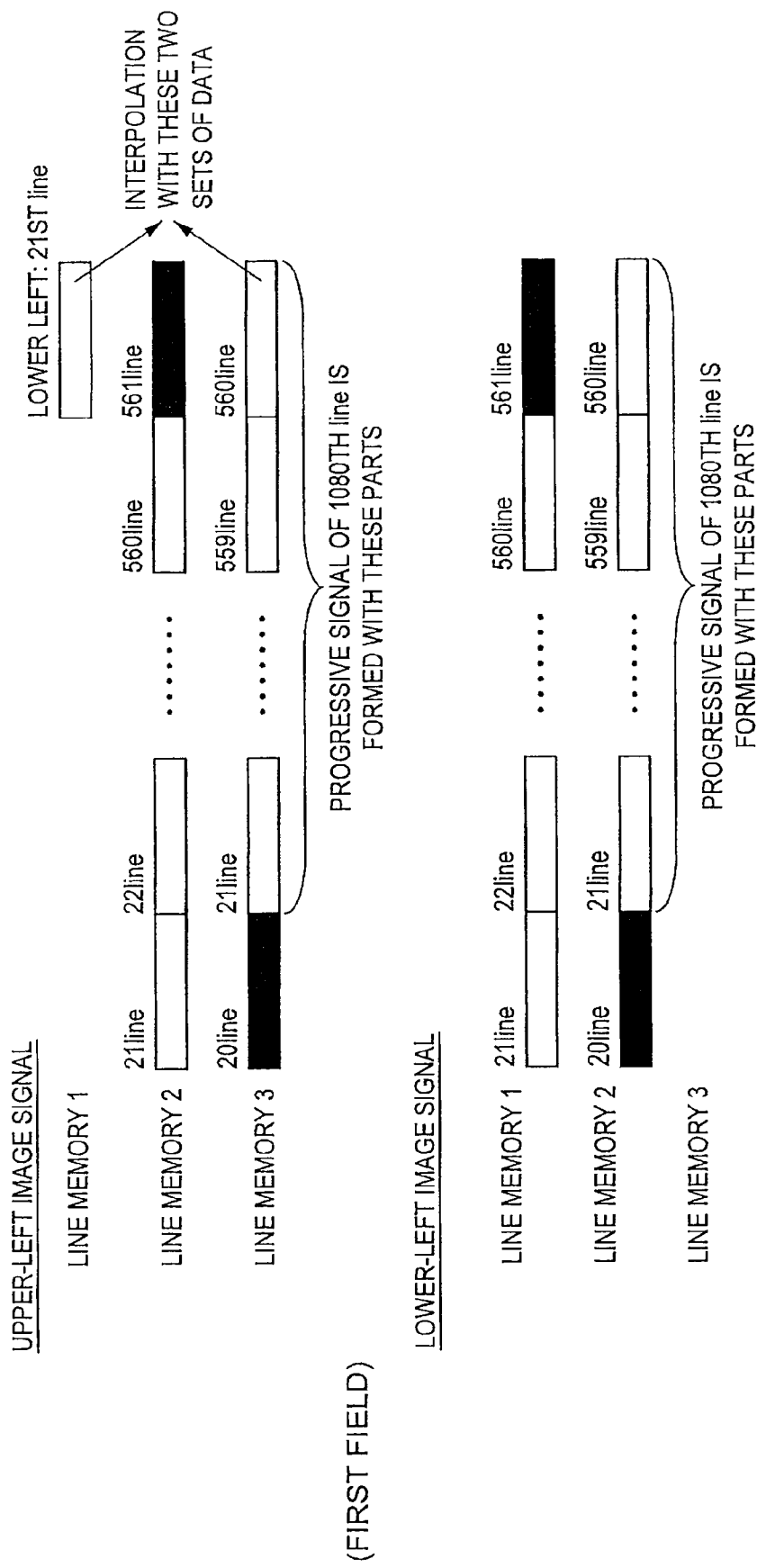
FIG. 12A illustrates a flow of HD-SDI signals to be supplied to the video signal processing apparatus 200 according to the second embodiment of the present invention.
Figure 13:
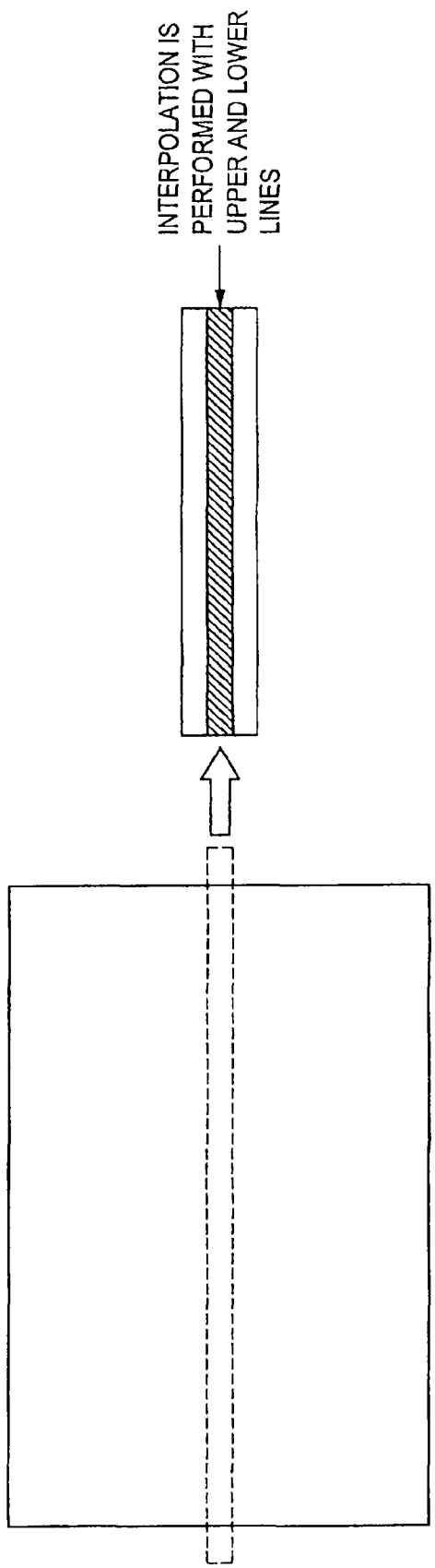
FIG. 13 schematically shows an interpolating operation involving an I-P conversion.

FIGS. 12A and 12B illustrate the flows of the HD-SDI signals to be supplied to the video signal processing apparatus 200 according to the second embodiment of the present invention. Referring now to FIGS. 12A and 12B, the flows of the HD-SDI signals to be supplied to the video signal processing apparatus 200 according to the second embodiment of the present invention are described.

Referring first to FIG. 12A, the flow of the signals of the first field of the HD-SDI signals is described. In a case where the signal of the 21st line is stored in the second line memory 225, the signal of the 20th line is stored in the third line memory 226. In this case, the switches 228a and 228b are controlled so that the signals stored in the second line memory 225 and the third line memory 226 are supplied to the interpolating unit 230.

After some time has passed, the signal of the 561st line is stored in the second line memory 225, and the signal of the 560th line is stored in the third line memory 226. If an I-P converting operation is performed on the upper-left image signal at this point, the signal of the 21st line of the lower-left image signal stored beforehand in the first line memory 224 and the signal of the 560th line of the upper-left image signal stored in the third line memory 226 are used. Therefore, the switch 228a is switched to the terminal "1", so that the signals stored in the first line memory 224 are supplied to the interpolating unit 230.

As shown in FIG. 12A, the interpolating unit 230 generates the progressive signals of 1080 lines, using the signals of the 21st line through the 561st line of the first field. However, when an interpolating operation is performed on the upper-left image signal, the signal of the 21st line of the lower-left image signal is used, instead of the signal of the 561st line. The signals to be supplied to the interpolating unit 230 are switched in this manner, and the interpolating unit 230 generates the progressive signals of the 1080 lines. Thus, a thin, dark line is prevented from appearing on the boundary between the upper-left screen 101a and the lower-left screen 101b.

Referring now to FIG. 12B, the flow of the signals of the second field of the HD-SDI signals is described. In a case where the signal of the 584th line is stored in the second line memory 225, the signal of the 583rd line is stored in the third line memory 226. In this case, the switches 228a and 228b are controlled so that the signals stored in the second line memory 225 and the third line memory 226 are supplied to the interpolating unit 230.

After some time has passed, the signal of the 584th line is stored in the second line memory 225, and the signal of the 583rd line is stored in the third line memory 226. If an I-P converting operation is performed on the lower-left image signal at this point, the signal of the 1123rd line of the upper-left image signal stored beforehand in the first line memory 224 and the signal of the 584th line of the lower-left image signal stored in the second line memory 225 are used. Therefore, the switch 228b is switched to the terminal "1", so that the signals stored in the first line memory 224 are supplied to the interpolating unit 230.

Each of the switches 228a and 228b is then switched to the terminal "1", so that the signals stored in the first line memory 224 are supplied to the interpolating unit 230. When the signal of the next line is interpolated, each of the switches 228a and 228b is switched back to the terminal "2". Thereafter, the switching of the terminals of the switches 228a and 228b is repeated, so as to control the supplies of signals to the interpolating unit 230.

As shown in FIG. 12B, the interpolating unit 230 generates the progressive signals of 1080 line, using the signals of the 583rd line through the 1123rd line in the second field. However, when an interpolating operation is performed on the lower-left image signal, the signal of the 1123rd line of the upper-left image signal is used, instead of the signal of the 583rd line. The signals to be supplied to the interpolating unit 230 are switched in this manner, and the interpolating unit 230 generates the progressive signals of 1080 lines. Thus, a thin, dark line is prevented from appearing on the boundary between the upper-left screen 101a and the lower-left screen 101b.

The signals to be supplied to the interpolating unit 230 are switched by the switches 228a and 228b in this manner, so that the signals to be subjected to the interpolating operation by the interpolating unit 230 can be switched. By switching the signals to be supplied, a thin, dark line can be prevented from appearing on the boundary between the valid image regions of each image. As a result, even after an I-P converting operation is performed on the HD-SDI signals of the screens adjacent to each other in the vertical direction, a thin, dark line does not appear at the boundary portion between the screens.

If the correlation check circuit 227 makes a correlation check and determines that there is not a correlation between the HD-SDI signals stored in the first line memory 224 and the HD-SDI signals stored in the second line memory 225 or the third line memory 226, the image displayed through the upper-left image signal is determined to be different from the image displayed through the lower-left image signal, and the switches 228a and 228b may not be switched.

The operations of the video signal processing apparatus 200 according to the second embodiment of the present invention have been described above.

As described above, according to the second embodiment of the present invention, the interlaced signals of several screens are buffered, and the buffered data is read out line by line and is stored into line memories. In this manner, a different I-P converting operation is performed on the line on the boundary between screens. As a result, even after an I-P converting operation is performed on the line on the boundary between screens, the line on the boundary does not become dark. Thus, an image that does not have a thin line at its center can be displayed.

The above described operations may be performed by a processor such as a CPU sequentially reading and executing a computer program product stored in the video signal processing apparatus 100 or 200 (stored in a semiconductor memory such as an EEPROM or a flash memory). A computer-readable recording medium that stores the computer program product is also provided. Such a recording medium may be a magnetic disk or an optical disk, for example.

It should be understood by those skilled in the art that various modifications, combinations, sub-combinations and alterations may occur depending on design requirements and other factors insofar as they are within the scope of the appended claims or the equivalents thereof.

In the first embodiment of the present invention, one line of image data is obtained from each of two image data sets adjacent to each other in the vertical direction, and one extra line is stored into each image memory. However, the present invention is not limited to that example. For instance, two or more lines of image data may be obtained from each of the two image data sets adjacent to each other in the vertical direction, and two or more extra lines may be stored into each image memory.

What is claimed is:

1. A video signal processing apparatus comprising:
a video signal input unit that receives an input of interlaced video signals for displaying a plurality of screens including at least two screens adjacent to each other in a vertical direction, the input being on a screen-by-screen basis; and
a converting unit that converts the input interlaced video signals into progressive video signals,
wherein the lowermost line of a valid image region in which an image is displayed through the interlaced video signals being converted with the use of an interlaced video signal corresponds to the uppermost line of the valid image region of a screen located below a subject screen when there exists the screen located below the subject screen, and wherein the uppermost line of the valid image region of the subject screen being converted with the use of an interlaced video signal corresponds to the lowermost line of the valid image region of a screen located above the subject screen when there exists the screen located above the subject screen.

2. The video signal processing apparatus according to claim 1, wherein the converting unit includes:

an image data storage unit that stores the interlaced video signals of all lines of the valid image region of the subject screen and the interlaced video signals of a predetermined number of lines counted downward from the uppermost line of the valid image region of the screen located below the subject screen when there exists the screen located below the subject screen, and stores the interlaced video signals of all the lines of the valid image region of the subject screen and the interlaced video signals of a predetermined number of lines counted upward from the lowermost line of the valid image region of the screen located above the subject screen when there exists the screen located above the subject screen, the interlaced video screens being stored on a screen-by-screen basis; and an interpolating unit that converts the interlaced video signals stored on a screen-by-screen basis in the image data storage unit into the progressive video signals.

3. The video signal processing apparatus according to claim 2, further comprising:

a correlation check unit that determines whether there is a correlation between the lowermost line of the valid image region of the upper one of two screens adjacent to each other in the vertical direction and the uppermost line of the valid image region of the lower screen, and, when there is not a correlation, performs a control operation so that the interlaced video signals from the adjacent screen are not stored into the image data storage unit.

4. The video signal processing apparatus according to claim 2, further comprising:

a line measuring unit that measures a position of a subject line before an interlaced video signal is stored into the image data storage unit; and a switching unit that is switched so that the interlaced video signal is stored into the image data storage unit corresponds to the screen located above or below the subject screen when the measurement value of the line measuring unit becomes equal to a predetermined value.

5. The video signal processing apparatus according to claim 1, wherein the converting unit includes:

an image data storage unit that stores the interlaced video signals input to the video signal input unit;

a first line data storage unit that temporarily and sequentially stores line by line the interlaced video signals stored in the image data storage unit;

a second line data storage unit that sequentially stores the interlaced video signals of the line next to the line stored in the first line data storage unit;

a third line data storage unit that stores the interlaced video signal corresponds to the uppermost line of the valid image region of the screen located below the subject screen or the interlaced video signal corresponds to the lowermost line of the valid image region of the screen located above the subject screen; and an interpolating unit that converts the interlaced video signals into the progressive video signals, the interlaced video signal of the uppermost line of the valid image region of the subject screen or the lowermost line of the valid image region of the subject screen being converted into a progressive video signal with the use of the interlaced video signal stored in the first line data storage unit or the second line data storage unit and the interlaced video signal stored in the third line data storage unit, the interlaced video signal of a line other than the uppermost line of the valid image region of the subject screen or a line other than the lowermost line of the valid image region of the subject screen being converted into a progressive video signal with the use of the interlaced video signal stored in the first line data storage unit and the interlaced video signal stored in the second line data storage unit.

6. The video signal processing apparatus according to claim 3, further comprising:

a correlation check unit that determines whether there is a correlation between the lowermost line of the valid image region of the upper one of two screens adjacent to each other in the vertical direction and the uppermost line of the valid image region of the lower screen, and, when there is not a correlation, controls the interpolating unit to perform a converting operation using the interlaced video signal stored in the first line data storage unit and the interlaced video signal stored in the second line data storage unit.

7. The video signal processing apparatus according to claim 2, further comprising:

a line measuring unit that measures a position of a line of an interlaced video signal to be subjected to a converting operation before the interlaced video signal is converted into a progressive video signal at the interpolating unit; and a switching unit that is switched so that the interpolating unit performs a converting operation on the interlaced video signal stored in the third line data storage unit, when the measurement value of the line measuring unit becomes equal to a predetermined value.

8. A video signal processing method comprising:

receiving an input of interlaced video signals for displaying a plurality of screens including at least two screens adjacent to each other in a vertical direction, the input being on a screen-by-screen basis; and converting the interlaced video signals into progressive video signals, wherein the lowermost line of a valid image region in which an image is displayed through the interlaced video signals being converted with the use of an interlaced video signal corresponds to the uppermost line of the valid image region of a screen located below a subject screen when there exists the screen located below the subject screen, and wherein the uppermost line of the valid image region of the subject screen being converted with the use of an interlaced video signal corresponds to the lowermost line of the valid image region of a screen located above the subject screen when there exists the screen located above the subject screen.

9. A non-transitory computer readable medium encoded with a computer program that causes a computer to perform a method comprising:

receiving an input of interlaced video signals for displaying a plurality of screens including at least two screens adjacent to each other in a vertical direction, the input being on a screen-by-screen basis; and converting the interlaced video signals into progressive video signals, wherein the lowermost line of a valid image region in which an image is displayed through the interlaced video signals being converted with the use of an interlaced video signal corresponds to the uppermost line of the valid image region of a screen located below a subject screen when there exists the screen located below the subject screen, and wherein the uppermost line of the valid image region of the subject screen being converted with the use of an interlaced video signal corresponds to the lowermost line of the valid image region of a screen located above the subject screen when there exists the screen located above the subject screen.

* * * * *